(12) United States Patent
Kawai

(10) Patent No.: US 8,958,009 B2
(45) Date of Patent: Feb. 17, 2015

(54) IMAGE-CAPTURING DEVICE

(75) Inventor: Atsushi Kawai, Tokyo (JP)

(73) Assignee: Nikon Corporation, Tokyo (JP)

( * ) Notice: Subject to any disclaimer, the term of this patent is extended or adjusted under 35 U.S.C. 154(b) by 657 days.

(21) Appl. No.: 12/987,437

(22) Filed: Jan. 10, 2011

(65) Prior Publication Data
US 2011/0199534 A1 Aug. 18, 2011

(30) Foreign Application Priority Data

| Jan. 12, 2010 | (JP) | 2010-004218 |
| Jun. 17, 2010 | (JP) | 2010-138440 |
| Dec. 9, 2010 | (JP) | 2010-274724 |
| Dec. 9, 2010 | (JP) | 2010-274725 |

(51) Int. Cl.
H04N 5/232 (2006.01)
G03B 13/00 (2006.01)
G02B 7/36 (2006.01)
H04N 9/04 (2006.01)

(52) U.S. Cl.
CPC ............ G02B 7/365 (2013.01); H04N 5/23212 (2013.01); H04N 9/045 (2013.01)
USPC ........................................................ 348/349

(58) Field of Classification Search
None
See application file for complete search history.

(56) References Cited

U.S. PATENT DOCUMENTS

| 5,192,998 | A | * | 3/1993 | Tokumitsu et al. ............ 348/349 |
| 5,212,516 | A |   | 5/1993 | Yamada et al. |
| 5,376,991 | A | * | 12/1994 | Kaneda et al. ................. 348/355 |
| 5,742,892 | A |   | 4/1998 | Chaddha |
| 6,091,862 | A |   | 7/2000 | Okisu |
| 2002/0135683 | A1 | * | 9/2002 | Tamama et al. ............... 348/222 |
| 2003/0020819 | A1 |   | 1/2003 | Fukuda |
| 2003/0099044 | A1 | * | 5/2003 | Fujii ............................. 359/698 |
| 2004/0165090 | A1 | * | 8/2004 | Ning ............................. 348/272 |
| 2006/0078217 | A1 | * | 4/2006 | Poon et al. .................... 382/255 |
| 2007/0116375 | A1 | * | 5/2007 | Utsugi et al. .................. 382/264 |

(Continued)

FOREIGN PATENT DOCUMENTS

| CN | 1487728 A | 4/2004 |
| EP | 0 335 656 A1 | 10/1989 |

(Continued)

OTHER PUBLICATIONS

JP-2002-214513-A Translation.*
Jun. 27, 2011 search report issued in European Patent Application No. 11150773.7.

(Continued)

*Primary Examiner* — Jason Flohre
(74) *Attorney, Agent, or Firm* — Oliff PLC

(57) ABSTRACT

An image-capturing device includes: an input unit that inputs a subject image formed by an optical system manifesting axial chromatic aberration as an input image; an edge detection unit that detects edges in the input image, each in correspondence to one of color components; a focus adjustment unit that executes focus adjustment for the optical system by detecting contrast differences of the edges corresponding to individual color components having been detected and then moving a focus adjustment lens included in the optical system; and a lens moving direction determining unit that determines a moving direction along which the focus adjustment lens is to move for purposes of focus adjustment based upon the edges corresponding to the individual color components having been detected and the axial chromatic aberration. The focus adjustment unit causes the focus adjustment lens to move along the moving direction determined by the lens moving direction determining unit.

27 Claims, 24 Drawing Sheets

(56) References Cited

U.S. PATENT DOCUMENTS

2009/0102963 A1* 4/2009 Yeo et al. .................... 348/349
2010/0128144 A1* 5/2010 Tay ............................ 348/229.1

FOREIGN PATENT DOCUMENTS

| JP | A-3-136012 | 6/1991 |
| JP | A-03-204277 | 9/1991 |
| JP | A-6-138362 | 5/1994 |
| JP | A 6-153054 | 5/1994 |
| JP | A-9-139940 | 5/1997 |
| JP | A-10-164602 | 6/1998 |
| JP | A-2000-165892 | 6/2000 |
| JP | A-2000-299874 | 10/2000 |
| JP | 2002214513 A * | 7/2002 |
| JP | A-2002-214513 | 7/2002 |
| JP | A-2003-15026 | 1/2003 |
| JP | A-2003-46876 | 2/2003 |
| JP | 2004-157456 A | 6/2004 |
| JP | A-2008-42937 | 2/2008 |
| JP | A-2009-103800 | 5/2009 |
| JP | A-2011-107682 | 6/2011 |
| JP | A 2011-154194 | 8/2011 |
| JP | A 2010-286752 | 12/2012 |

OTHER PUBLICATIONS

Office Action issued in Japanese Patent Application No. 2010-274725 dated Nov. 20, 2012 (with translation).
Notification for Reasons for Refusal issued in Japanese Application No. 2010-004218 Dated Dec. 20, 2011 (with trans).
Office Action issued in Japanese Patent Application No. 2010-274725 dated Apr. 17, 2012 (with translation).
Office Action issued in Japanese Patent Application No. 2010-274724 dated Apr. 17, 2012 (with translation).
European Office Action issued in European Application No. 11 150 773.7 dated Jul. 31, 2012.
Sep. 20, 2013 Search Report issued in European Patent Application No. 11 150 773.7-1562.
Dec. 4, 2012 Search Report issued in International Patent Application No. PCT/JP2012/005539 (with translation).
Mar. 4, 2014 International Preliminary Report on Patentability issued in International Patent Application No. PCT/JP2012/005539 (with translation).
Dec. 19, 2014 Office Action issued in European Application No. 11150773.7.
Oct. 10, 2014 Office Action issued in Chinese Application No. 201110008088.8.

* cited by examiner

FIG.12

| R | Gr | R | Gr | R | Gr |
|---|----|---|----|---|----|
| Gb | B | Gb | B | Gb | B |
| R | Gr | R | Gr | R | Gr |
| Gb | B | Gb | B | Gb | B |
| R | Gr | R | Gr | R | Gr |
| Gb | B | Gb | B | Gb | B |

FIG.13A

| -1 | | -2 | | -1 |
|---|---|---|---|---|
| | | | | |
| 0 | | 0 | | 0 |
| | | | | |
| 1 | | 2 | | 1 |

FIG.13B

| -1 | | 0 | | 1 |
|---|---|---|---|---|
| | | | | |
| -2 | | 0 | | 2 |
| | | | | |
| -1 | | 0 | | 1 |

FIG.13C

| -2 | | -1 | | 0 |
|---|---|---|---|---|
| | | | | |
| -1 | | 0 | | 1 |
| | | | | |
| 0 | | 1 | | 2 |

FIG.13D

| 0 | | 1 | | 2 |
|---|---|---|---|---|
| | | | | |
| -1 | | 0 | | 1 |
| | | | | |
| -2 | | -1 | | 0 |

FIG.15A    FIG.15B
  
FIG.15C
| R | Gr | R | Gr | R | Gr |
|---|----|---|----|---|----|
|   |    |   |    |   |    |
| R | Gr | R | Gr | R | Gr |
|   |    |   |    |   |    |
| R | Gr | R | Gr | R | Gr |
|   |    |   |    |   |    |
FIG.15D
|    |   |    |   |    |   |
|----|---|----|---|----|---|
| Gb | B | Gb | B | Gb | B |
|    |   |    |   |    |   |
| Gb | B | Gb | B | Gb | B |
|    |   |    |   |    |   |
| Gb | B | Gb | B | Gb | B |

FIG.16A          FIG.16B
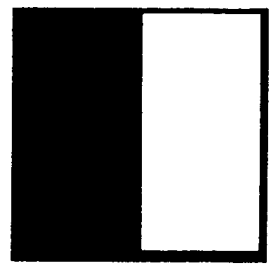    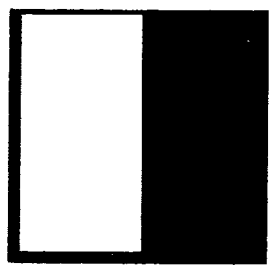
FIG.16C          FIG.16D
| R | | R | | R | |
|---|---|---|---|---|---|
| Gb | | Gb | | Gb | |
| R | | R | | R | |
| Gb | | Gb | | Gb | |
| R | | R | | R | |
| Gb | | Gb | | Gb | |
| | Gr | | Gr | | Gr |
|---|---|---|---|---|---|
| | B | | B | | B |
| | Gr | | Gr | | Gr |
| | B | | B | | B |
| | Gr | | Gr | | Gr |
| | B | | B | | B |

FIG.17A    FIG.17B    FIG.17C    FIG.17D
 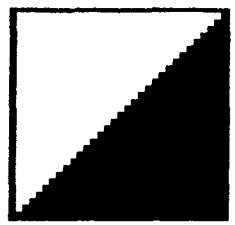  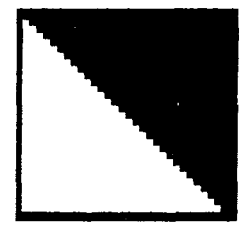
FIG.17E
| R |   | R |   | R |   |
|   | B |   | B |   | B |
| R |   | R |   | R |   |
|   | B |   | B |   | B |
| R |   | R |   | R |   |
|   | B |   | B |   | B |

FIG.21A

| 1 | 0 | 0 |
|---|---|---|
| 0 | 14 | 0 |
| 0 | 0 | 1 |

FIG.21B

| 0 | 0 | 1 |
|---|---|---|
| 0 | 14 | 0 |
| 1 | 0 | 0 |

IMAGE-CAPTURING DEVICE

INCORPORATION BY REFERENCE

The disclosures of the following priority applications are herein incorporated by reference: Japanese Patent Application No. 2010-4218 filed Jan. 12, 2010, Japanese Patent Application No. 2010-138440 filed Jun. 17, 2010, Japanese Patent Application No. 2010-274724 filed Dec. 9, 2010 and Japanese Patent Application No. 2010-274725 filed Dec. 9, 2010.

BACKGROUND OF THE INVENTION

1. Field of the Invention

The present invention relates to an image-capturing device

2. Description of Related Art

There is an autofocusing device known in the related art that detects a shift in the lens focusing position by using a chromatic aberration manifesting in the light and corrects blurring of light in various colors through focus adjustment executed based upon the detection results (see, for instance, Japanese Laid Open Patent Publication No. H6-138362)

SUMMARY OF THE INVENTION

However, there is an issue with the autofocusing device in the related art in that since the specific direction in which the AF lens position is offset relative to the focus match position along the optical axis cannot be detected, a decision as to which direction the AF lens should be driven to achieve a focus match cannot be made with a high degree of accuracy.

According to the 1st aspect of the present invention, an image-capturing device comprises: an input unit that inputs a subject image formed by an optical system manifesting axial chromatic aberration as an input image; an edge detection unit that detects edges in the input image input by the image input unit, each in correspondence to one of color components; a focus adjustment unit that executes focus adjustment for the optical system by detecting contrast differences of the edges corresponding to individual color components having been detected by the edge detection unit and then moving a focus adjustment lens included in the optical system; and a lens moving direction determining unit that determines a moving direction along which the focus adjustment lens is to move for purposes of focus adjustment based upon the edges corresponding to the individual color components having been detected by the edge detection unit and the axial chromatic aberration. The focus adjustment unit causes the focus adjustment lens to move along the moving direction determined by the lens moving direction determining unit.

According to the 2nd aspect of the present invention, in the image-capturing device according to the 1st aspect, it is preferred that the image-capturing device further comprises that a calculation unit that calculates a blurring width difference indicating a difference between edge blurring widths of edges corresponding to two color components each manifesting the axial chromatic aberration, among the edges of the individual color components having been detected by the edge detection unit. The lens moving direction determining unit determines the moving direction along which the focus adjustment lens is to move based upon the blurring width difference having been calculated by the calculation unit.

According to the 3rd aspect of the present invention, in the image-capturing device according to the 2nd aspect, it is preferred that the calculation unit calculates a specific evaluation value based upon a color difference sum of color differences for the edges corresponding to the two color components manifesting the axial chromatic aberration and calculates the blurring width difference by using the evaluation value thus calculated.

According to the 4th aspect of the present invention, in the image-capturing device according to the 3rd aspect, it is preferred that the calculation unit divides the edges corresponding to the two color components manifesting the axial chromatic aberration into a flat portion and an edge portion and calculates the color difference sum for the edge portion.

According to the 5th aspect of the present invention, in the image-capturing device according to the 2nd aspect, it is preferred that the calculation unit individually measures the edge blurring widths of the edges corresponding to the two color components manifesting the axial chromatic aberration and calculates the blurring width difference based upon measurement results.

According to the 6th aspect of the present invention, in the image-capturing device according to the 2nd aspect, it is preferred that the calculation unit calculates the blurring width difference based upon the edge blurring widths and edge gradients of the edges corresponding to the two color components manifesting the axial chromatic aberration, as well as the contrast differences each manifesting between two sides of one of the edges.

According to the 7th aspect of the present invention, in the image-capturing device according to the 2nd aspect, it is preferred that the calculation unit calculates the blurring width difference based upon edge brightness areas of one of the edges corresponding to the two color components manifesting the axial chromatic aberration and the contrast differences each manifesting between two sides of an edge.

According to the 8th aspect of the present invention, in the image-capturing device according to the 2nd aspect, it is preferred that the image-capturing device further comprises a color correction unit that executes correction so as to eliminate the contrast differences each manifesting between two sides of one of the edges corresponding to the two color components manifesting the axial chromatic aberration. The calculation unit calculates the blurring width difference by using an image resulting from the correction executed by the color correction unit.

According to the 9th aspect of the present invention, in the image-capturing device according to the 2nd aspect, it is preferred that the calculation unit calculates the blurring width difference only after executing up-sampling processing on the input image.

According to the 10th aspect of the present invention, in the image-capturing device according to the 2nd aspect, it is preferred that the image-capturing device further comprises a selection unit that selects two color components manifesting the axial chromatic aberration among color components constituting the input image. The selection unit selects pixels representing two color components, to be used to achieve uniformity of resolution, which assumes varying levels due to a factor other than axial chromatic aberration, in correspondence to a direction of an edge present in the input image.

According to the 11th aspect of the present invention, in the image-capturing device according to the 10th aspect, it is preferred that the input image is a raw image generated through a pixel sum read.

According to the 12th aspect of the present invention, in the image-capturing device according to the 11th aspect, it is preferred that the selection unit selects the pixels representing the two color components, to be used to achieve uniformity of resolution, which assumes varying levels due to a factor other than the axial chromatic aberration, by taking into consideration a positional relationship between pixel positions assumed by pixels representing various color components in an initial raw image read out from an image sensor and pixel positions assumed by pixels representing the various color components in the raw image generated through the pixel sum read.

According to the 13th aspect of the present invention, in the image-capturing device according to the 10th aspect, it is preferred that the input image is an image having undergone interpolation processing.

According to the 14th aspect of the present invention, in the image-capturing device according to the 2nd aspect, it is preferred that the image-capturing device further comprises a resolution change correction unit that corrects a resolution change occurring in relative resolution levels of the individual color components due to a factor other than the axial chromatic aberration, based upon the edges corresponding to the individual color components having been detected by the edge detection unit. The blurring width difference is calculated by the calculation unit based upon the edges corresponding to the individual color components detected by the edge detection unit from an image having been corrected by the resolution change correction unit for any resolution change in relative resolution levels of the individual color components.

According to the 15th aspect of the present invention, in the image-capturing device according to the 14th aspect, it is preferred that occurrence of the resolution change in relative resolution levels of the individual color components is attributable to a pixel sum read from an image sensor or image processing.

According to the 16th aspect of the present invention, in the image-capturing device according to the 14th aspect, it is preferred that the resolution change in relative resolution levels of the individual color components has dependency on an edge direction relative to a pixel array assumed for pixels constituting the image, colors assumed on two sides of the edge, the shape of the edge and a condition in the optical system.

According to the 17th aspect of the present invention, in the image-capturing device according to the 14th aspect, it is preferred that the resolution change correction unit corrects the resolution change by applying a smoothing filter assuming a preselected coefficient to pixels representing a color component, a resolution level of which is to match the resolution level of another color component.

According to the 18th aspect of the present invention, in the image-capturing device according to the 14th aspect, it is preferred that the resolution change correction unit corrects the resolution change by applying an edge enhancement filter assuming a preselected coefficient to pixels representing a color component, a resolution level of which is to match the resolution level of another color component.

According to the 19th aspect of the present invention, in the image-capturing device according to the 17th aspect, it is preferred that the resolution change correction unit alters the coefficient based upon edge characteristics unique to the input image.

According to the 20th aspect of the present invention, in the image-capturing device according to the 1st aspect, it is preferred that the image-capturing device further comprises: an edge area image extraction unit that extracts from the input image an edge area image containing the edges corresponding to individual color components having been detected by the edge detection unit. The lens moving direction determining unit determines the direction along which the focus adjustment lens is to move by using the edge area image having been extracted by the edge area image extraction unit.

According to the 21th aspect of the present invention, in the image-capturing device according to the 20th aspect, it is preferred that the image-capturing device further comprises a color correction unit that executes color correction so as to eliminate a color difference manifested between two sides of an edge in the edge area image having been extracted by the edge area image extraction unit. The lens moving direction determining unit determines the direction along which the focus adjustment lens is to move by using the edge area image having undergone the color correction executed by the color correction unit.

According to the 22th aspect of the present invention, in the image-capturing device according to the 21st aspect, it is preferred that the color correction unit executes the color correction by normalizing color ratios of the individual color components in areas on the two sides of the edge so that the color ratios achieve a specific value.

According to the 23th aspect of the present invention, in the image-capturing device according to the 21st aspect, it is preferred that further comprises: a magnification chromatic aberration correction unit that executes magnification chromatic aberration correction to correct any chromatic aberration of magnification manifesting in the edge area image having undergone the color correction executed by the color correction unit. The lens moving direction determining unit determines the direction along which the focus adjustment lens is to move by using the edge area image having undergone the magnification chromatic aberration correction executed by the magnification chromatic aberration correction unit.

According to the 24th aspect of the present invention, in the image-capturing device according to the 23rd aspect, it is preferred that the magnification chromatic aberration correction unit executes the magnification chromatic aberration correction by shifting charts each indicating edge intensity corresponding to one of the color components within the edge area image so as to reduce an extent of offset manifested by the charts corresponding to the individual color components.

According to the 25th aspect of the present invention, in the image-capturing device according to the 20th aspect, it is preferred that the image-capturing device further comprises: a usability determining unit that determines whether or not the edge area image having been extracted by the edge area image extraction unit can be used to determine the direction along which the focus adjustment lens is to move. The lens moving direction determining unit determines the direction along which the focus adjustment lens is to move by using the edge area image determined to be usable by the usability determining unit.

According to the 26th aspect of the present invention, in the image-capturing device according to the 25th aspect, it is preferred that the usability determining unit determines the edge area image to be usable if an extent of offset manifested by charts each indicating edge intensity corresponding to one of the color components within the edge area image, is less than a predetermined offset quantity.

According to the 27th aspect of the present invention, in the image-capturing device according to 20th aspect, it is preferred that the lens moving direction determining unit determines the direction along which the focus adjustment lens is to move by calculating an index value for the edge area image, to be used when determining the direction along which the focus adjustment lens is to move, and comparing the index value with a preselected threshold value.

According to the 28th aspect of the present invention, in the image-capturing device according to the 27th, it is preferred that the lens moving direction determining unit calculates the index value based upon a color ratio pertaining to a color component manifesting the axial chromatic aberration different from axial chromatic aberration of another color component, among the individual color components in the edge area image.

According to the 29th aspect of the present invention, in the image-capturing device according to the 27th aspect, it is preferred that the image-capturing device further comprises: a history recording unit that records index value history indicating values previously calculated for the index value. The lens moving direction determining unit sets the threshold value based upon the index value history recorded by the history recording unit.

BRIEF DESCRIPTION OF THE DRAWINGS

FIG. 12 shows a Bayer array.

FIGS. 13A through 13D each present an example of a filter that may be used to detect a same color pixel gradient in the Bayer array.

FIGS. 15A through 15D show pixels used for purposes of focusing position decision-making in conjunction with an edge extending along the horizontal direction in the Bayer array.

FIGS. 16A through 16D show pixels used for purposes of focusing position decision making in conjunction with an edge extending along the vertical direction in the Bayer array.

FIGS. 17A through 17E show pixels used for purposes of focusing position decision making in conjunction with an edge extending along the diagonal directions in the Bayer array.

FIGS. 21A and 21B each show a smoothing filter assuming correction directionality.

DESCRIPTION OF PREFERRED EMBODIMENTS

Figure 1:
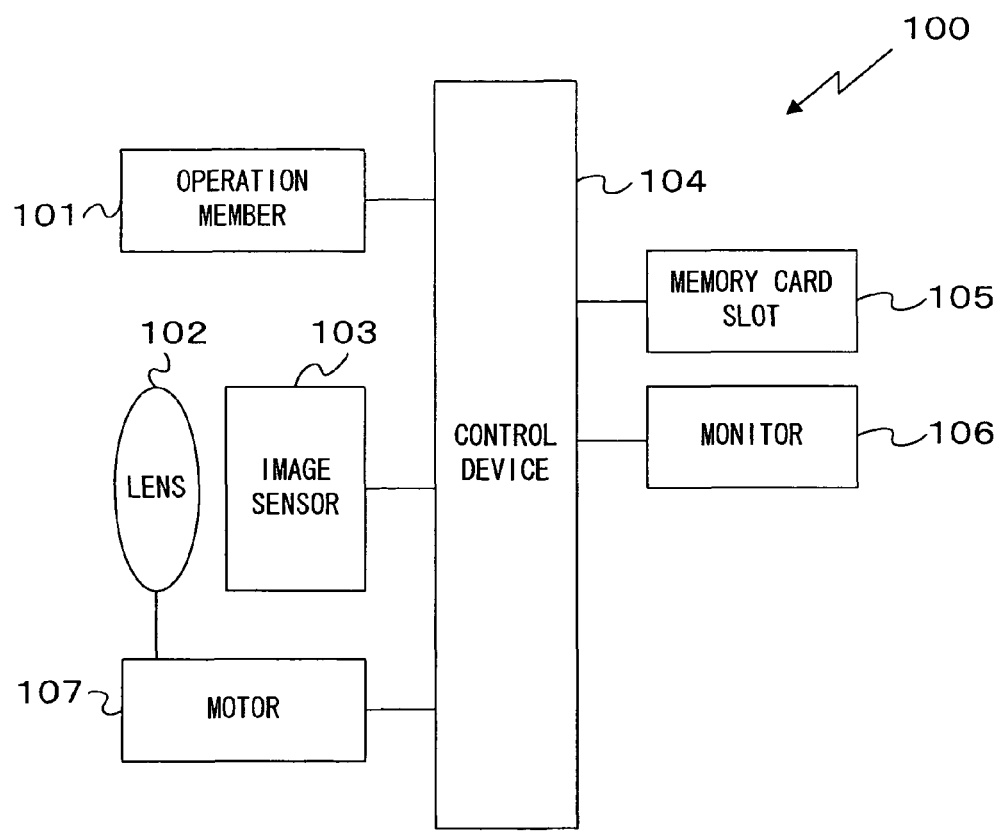
FIG. 1 is a block diagram showing the camera structure adopted in various embodiments.

FIG. 1 is a block diagram showing the structure adopted in a camera 100 applicable to the first through fourth embodiments. The camera 100 includes an operation member 101, a lens 102, an image sensor 103, a control device 104, a memory card slot 105, a monitor 106 and a motor 107. The operation member 101 includes various input members operated by the user, such as a power button, a shutter release button, a zoom button, a cross key, a confirm button, a reproduce button and a delete button.

While the lens 102 is constituted with a plurality of optical lenses, FIG. 1 shows it as a single representative lens. In addition, the lenses constituting the lens 102 include an AF lens (focus adjustment lens) used in AF (automatic focus adjustment) operation to be detailed later. The image sensor 103, which may be, for instance, a CCD image sensor or a CMOS image sensor, captures a subject image formed through the lens 102. Image signals obtained through the image capturing operation are then output to the control device 104.

The control device 104, constituted with a CPU, a memory and other peripheral circuits, controls the camera 100. It is to be noted that the memory in the control device 104 includes an SDRAM and a flash memory. The SDRAM, which is a volatile memory, is used as a work memory where a program is opened when the CPU executes the program or as a buffer memory where data are temporarily recorded. In the flash memory, which is a nonvolatile memory, data related to the program executed by the control device 104, various parameters read for program execution, and the like are recorded.

The control device 104 generates image data (hereafter referred to as "main image data") in a predetermined image format, e.g., the JPEG format, based upon the image signals input thereto from the image sensor 103. The control device 104 further generates display image data such as thumbnail image data based upon the image data having been generated. The control device 104 generates an image file containing the main image data and the thumbnail image data it has generated with header information appended thereto, and outputs the image file to the memory card slot 105.

At the memory card slot 105 where a memory card used as a storage medium is loaded, the image file output from the control device 104 is written and thus recorded into the memory card. In addition, an image file stored in the memory card is read at the memory card slot 105 in response to an instruction issued by the control device 104.

At the monitor 106, which is a liquid crystal monitor (a rear-side monitor) mounted at the rear surface of the camera 100, an image stored in the memory card, a setting menu enabling selection of settings for the camera 100 and the like are displayed. In addition, as the user sets the camera 100 in a photographing mode, the control device 104 outputs display image data expressing images obtained from the image sensor 103 in time series to the monitor 106. As a result, a live view image is brought up on display at the monitor 106.

The motor 107, driven based upon an output from the control device 104, moves the AF lens included in the lens 102 along the optical axis so as to achieve a focus match. Through this process, the focusing condition of the lens 102 is adjusted.

As a live view image input from the image sensor 103 starts, the control device 104 executes AF (automatic focus adjustment) processing and thus executes AF control at all times while the live view image is on display by continuously executing focus adjustment while the live view image is on display. In more specific terms, the control device 104 detects an edge in the input image and makes a decision based upon the detected edge as to the direction in which the current position of the AF lens in the lens 102 is offset along the optical axis relative to the focus match position. The control device 104 then determines the AF lens moving direction (i.e., the direction in which the AF lens needs to move along the optical axis) based upon the decision-making results so as to cause the AF lens to move toward the focus match position.

First Embodiment

Assuming that images captured in the camera 100 in the first embodiment are expressed with data in the RGB colorimetric system, different focus match positions are assumed along the optical axis in correspondence to the individual color components in an image input from the image sensor 103 to the control device 104, due to the variance among axial chromatic aberrations occurring in correspondence to the different color components, R, G and B. Accordingly, the decision as to the specific direction along the optical axis the current AF lens position is offset relative to the focus match position is made based upon an edge image in the input image by taking into consideration the varying focus match positions assumed on the optical axis in correspondence to the individual color components due to the variance in the axial chromatic aberration, so as to achieve AF control at all times while the live view image display is on.

Figure 2:
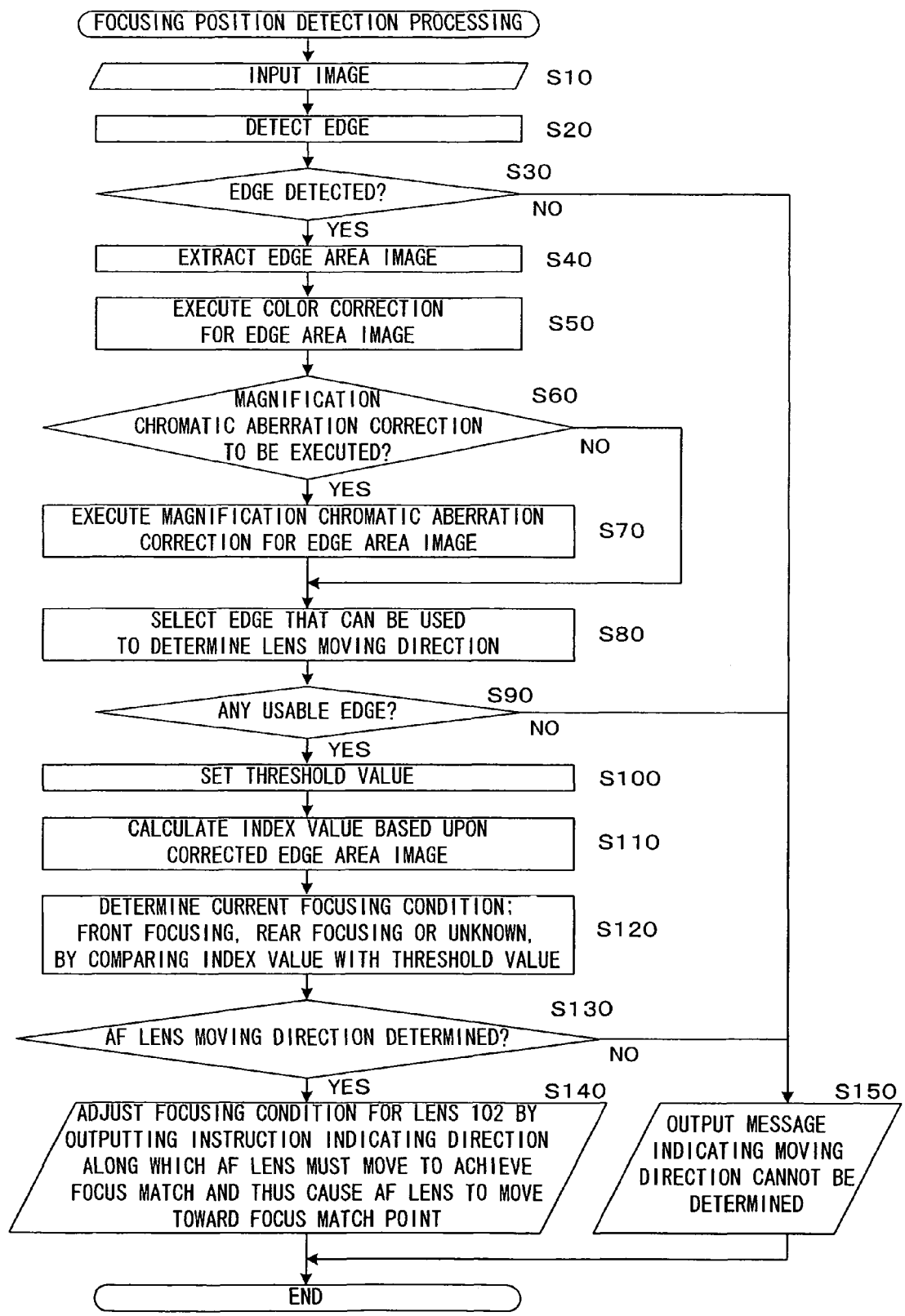
FIG. 2 presents a flowchart of the focusing position detection processing.

FIG. 2 presents a flowchart of the focusing position detection processing executed in the embodiment in order to enable AF control at all times while the live view image display is on. As a live view image input from the image sensor 103 starts, a program is started up and the processing in FIG. 2 is executed by the control device 104.

In step S10, the control device 104 reads image data (input image) input from the image sensor 103. The operation then proceeds to step S20. In step S20, the control device 104 detects an edge in the input image. Subsequently, the operation proceeds to step S30, in which the control device 104 makes a decision based upon the results of the edge detection processing having been executed in step S20 as to whether or not any edge has been detected in the input image. If a negative decision is made in step S30, the operation proceeds to step S150, in which the control device 104 decides that the AF lens moving direction cannot be determined and thus ends the processing. If, on the other hand, an affirmative decision is made in step S30, the operation proceeds to step S40.

Figure 3:
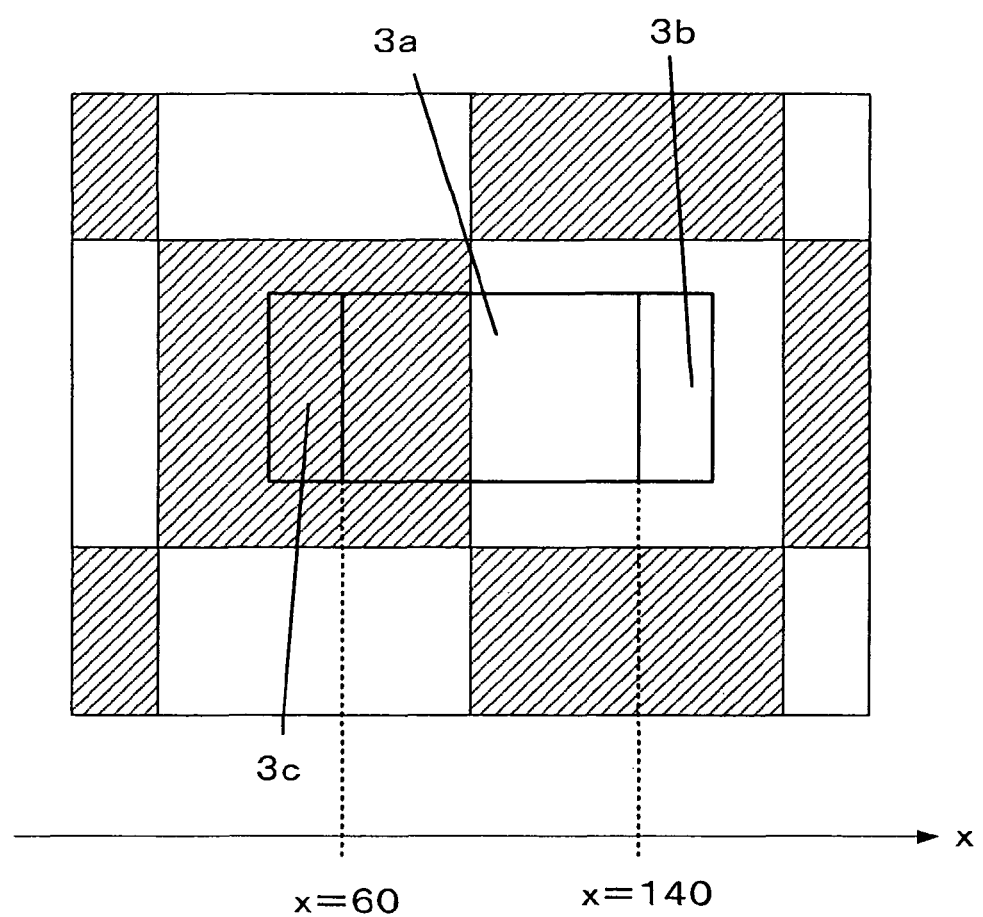
FIG. 3 shows how an edge area and edge background areas may be set.

In step S40, the control device 104 extracts, as an edge area image, an image in a specific edge area containing the edge having been detected from the input image. If a plurality of edges has been detected in the input image, images in a plurality of edge areas will be extracted in this step. Subsequently, the operation proceeds to step S50 in which the control device 104 executes color correction for the edge area image extracted in step S40. In more specific terms, the control device 104 sets an edge area 3a and edge background areas 3b and 3c adjacent to the edge area 3a, as shown in FIG. 3, and executes color correction through normalization executed so that the ratios of the individual color components achieve a specific value in the edge background area 3b and the edge background area 3c. Namely, the control device 104 executes color correction so as to eliminate color differences between the two sides of the edge.

Figure 4A:
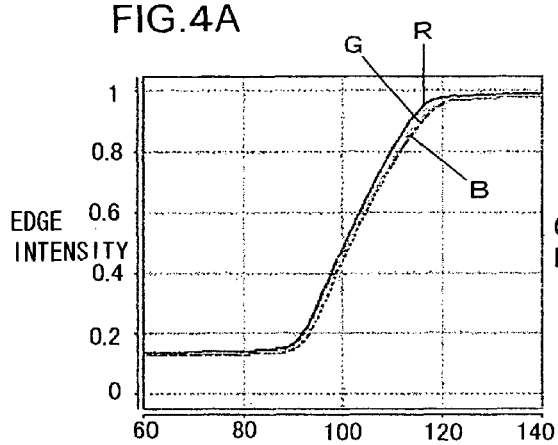
FIGS. 4A through 4F present specific examples of the edge intensity levels corresponding to the individual color components and the color ratios.
Figure 4B:
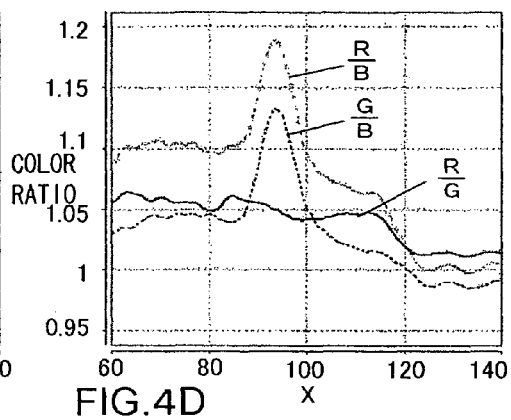
Figure 4C:
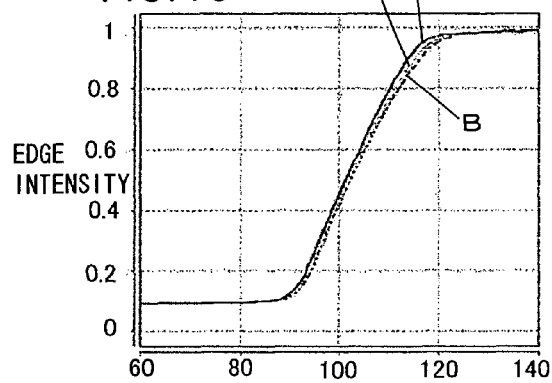
Figure 4D:
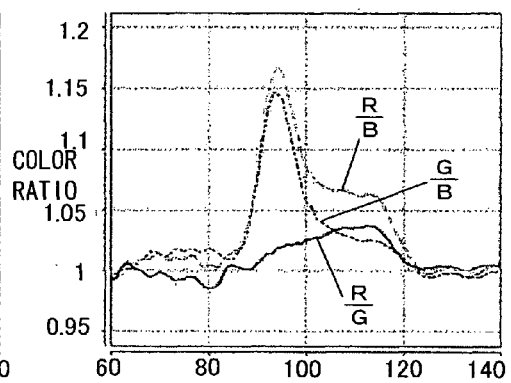

For instance, the edge intensity may change, as shown in FIG. 4A, through a range between the boundary (with the coordinate value x assumed along the horizontal direction (along the x direction) at 60) between the edge area 3a and the edge background area 3c and the boundary (with the x coordinate value assumed along the horizontal direction (along the x direction) at 140) between the edge area 3a and the edge background area 3b. FIG. 4B indicates the ratios of the individual color components (color ratios), i.e., R/G, R/B and G/B, calculated in this situation. As indicated in FIG. 4B, the color ratios at the boundary between the edge area 3a and the edge background area 3b (the color ratios corresponding to the edge background area 3b) each assume a value different from the value of the corresponding color ratio among the color ratios at the boundary between the edge area 3a and the edge background area 3c (the color ratios corresponding to the edge background area 3c). In the embodiment, normalization is executed so that the color ratios corresponding to the edge background area 3b and the color ratios corresponding to the edge background area 3c all assume a value of, for instance, 1. Through this normalizing operation, the individual color ratios are normalized as indicated in FIG. 4D. It is to be noted that FIG. 4C indicates the edge intensity levels of the various color components having undergone the color correction.

Subsequently, the operation proceeds to step S60 in which the control device 104 makes a decision as to whether or not the edge area image needs to be corrected for any chromatic aberration caused by magnification (hereafter referred to as magnification chromatic aberration). In more specific terms, the control device 104 makes a decision in correspondence to the direction of the edge within the input image as to whether or not magnification chromatic aberration correction needs to be executed for the particular edge area image. If a negative decision is made in step S60, the operation proceeds to step S80, which is to be described in detail later. If, on the other hand, an affirmative decision is made in step S60, the operation proceeds to step S70.

Figure 4E:
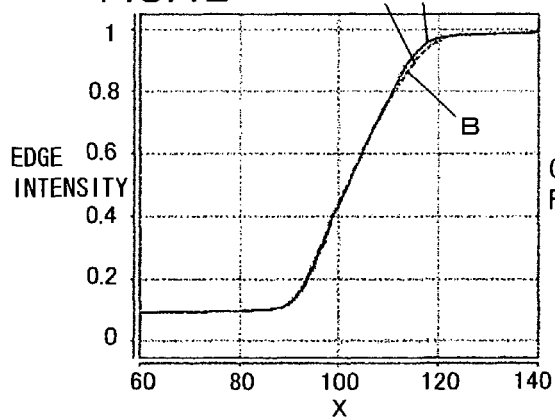
Figure 4F:
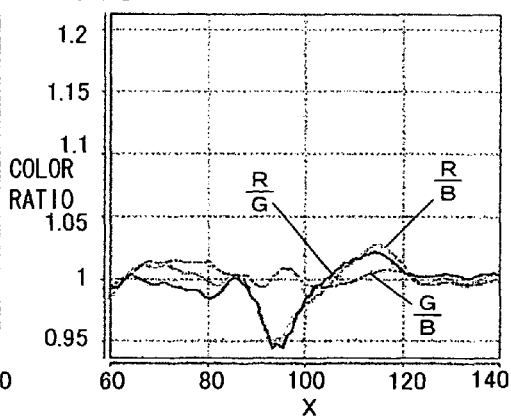

In step S70, the control device 104 corrects the magnification chromatic aberration in the edge area image. More specifically, the control device 104 corrects the magnification chromatic aberration by displacing, through parallel translation along the x-axis, the charts indicating the edge intensity levels of the individual color components in FIG. 4C, so as to reduce the extents of offset, as shown in FIG. 4E. As a result, the color ratios in FIG. 4D are altered to those indicated in FIG. 4F. The operation then proceeds to step S80.

In step S80, the control device 104 selects an edge among the plurality of edges detected in step S20, deemed usable in determining the direction along which the AF lens is to move. In more specific terms, if the extents of offset manifested by the charts in FIG. 4F indicating the edge intensity levels of the individual color components following the magnification chromatic aberration correction are less than a predetermined offset quantity, the control device 104 judges that the edge in the particular edge area image can be utilized to determine the AF lens moving direction along which the AF lens is to move. As an alternative, if a contrast difference is manifested by the edge intensity levels of at least two color components including a color component the axial chromatic aberration of which is different from the axial chromatic aberrations of the other color components, the control device 104 may judge that the edge contained in the particular edge area image can be used to determine the AF lens moving direction. For instance, if the R axial chromatic aberration is different from the axial chromatic aberrations of the G and B color components and a contrast difference is manifested by the edge intensity levels of the R component and at least either the G component or the B component, the particular edge may be judged to be usable in the direction determining operation.

Subsequently, the operation proceeds to step S90, in which the control device 104 makes a decision based upon the results of the selection executed in step S80 as to whether or not there is any edge that can be used to determine the AF lens moving direction. If a negative decision is made in step S90, the operation proceeds to step S150 having been described earlier. If, on the other hand, an affirmative decision is made in step S90, the operation proceeds to step S100.

In step S100, the control device 104 sets a threshold value to be used when determining the AF lens moving direction. In the embodiment, the AF lens moving direction is determined by comparing a mean value of color ratio values within a specific range set in the edge image area used in the direction determining operation, with the threshold value as described later. Accordingly, a color ratio value to be used as the threshold value is set in this step. It is to be noted that a predetermined specific value, e.g., 0.05, set in advance may be simply used as the threshold value or a value selected based upon the edge color or brightness may be set as the threshold value. As a further alternative, the AF lens moving direction may be determined through comparison of a value obtained by integrating color ratio values within a specific range set in the edge area image used in the direction determining operation with a threshold value and, in such a case, the threshold value should be set by taking into consideration that the threshold value is compared with an integrated value.

Subsequently, the operation proceeds to step S110, in which a color ratio mean, to be used as an index value when determining the AF lens moving direction, is calculated based upon the edge area image having undergone the color correction processing and the magnification chromatic aberration correction processing described above. More specifically, the control device 104 calculates an index value by calculating a mean color ratio value assumed for each color ratio corresponding to the color component, the axial chromatic aberration of which is different from those of the other color components, within a specific range taken along the x direction, e.g., 80≤x≤100. For instance, if the axial chromatic aberration of the R is different from the axial chromatic aberrations of the G color component and the B color component, the control device 104 will calculate index values by calculating means of the R/G values and the R/B values.

Figure 5A:
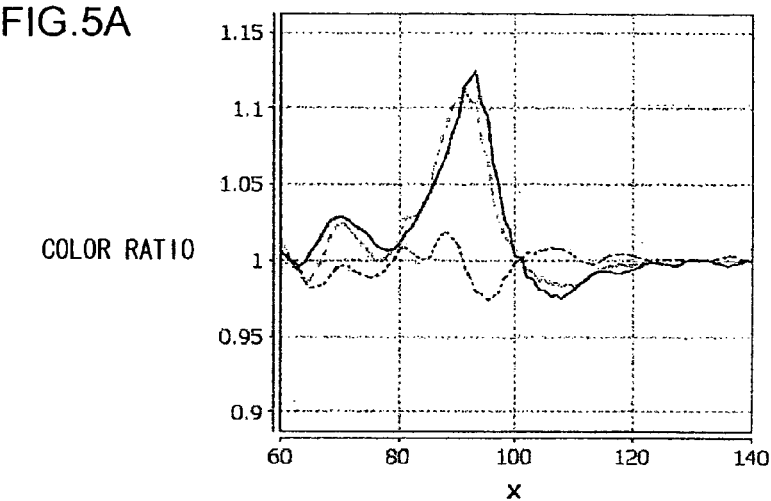
FIGS. 5A through 5C each indicate how the AF lens moving direction may be determined.
Figure 5B:
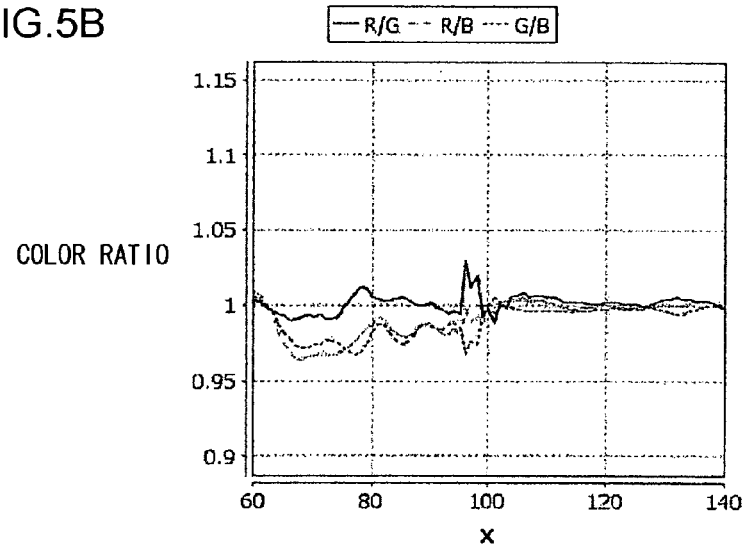
Figure 5C:
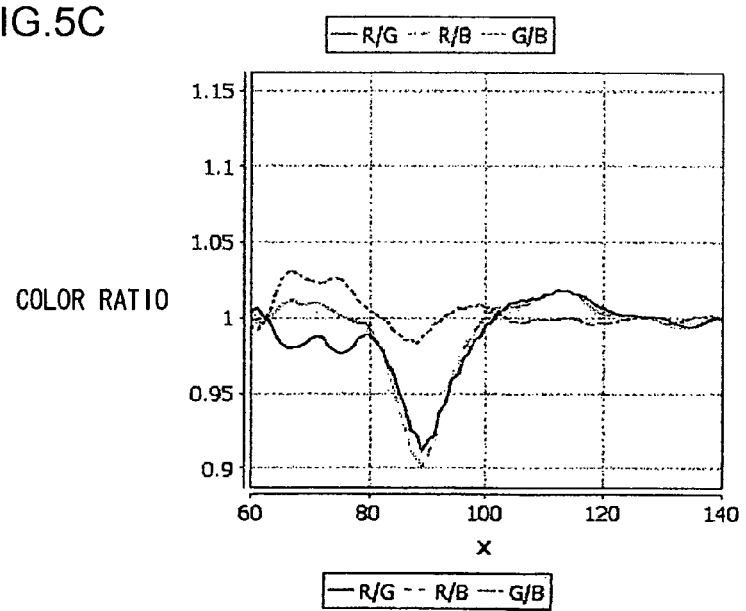

The operation then proceeds to step S120, in which the control device 104 determines the direction along which the AF lens is to move in order to achieve focus match, by comparing the index value having been calculated with the threshold value. Assuming that the value of 0.05 is set in advance as the threshold value, the control device 104 will judge that the AF lens is in a focus match condition and that the AF lens should not move if the color ratio mean values used as the index values are within a range of 1±0.05, as indicated in FIG. 5B. If, on the other hand, the color ratio mean values used as the index values are greater than 1.05 as shown in FIG. 5A, the control device 104 judges that rear focusing has occurred and determines that the AF lens should move toward the focus match point accordingly. In contrast, if the color ratio mean value used as the index values are smaller than 0.95 as shown in FIG. 5C, the control device 104 judges that front focusing has occurred and determines that the AF lens should move toward the focus match point accordingly.

The operation then proceeds to step S130, in which the control device 104 makes a decision as to whether or not the AF lens moving direction has been determined in step S120. If a negative decision is made in step S130, the operation proceeds to step S150 having been described earlier. If, on the other hand, an affirmative decision is made in step S130, the operation proceeds to step S140. In step S140, the control device 140 causes the AF lens to move toward the focus match point by outputting an instruction for the motor 107, which drives the AF lens, indicating the AF lens moving direction having been determined in step S120, and thus adjusts the focus of the lens 102. The processing then ends.

The following advantages are achieved through the first embodiment described above.

(1) The control device 104 detects an edge in the input image, extracts an edge area image containing the edge and determines the AF lens moving direction based upon axial chromatic aberration by using the edge area image having been extracted. Through these measures, the AF lens moving direction can be determined promptly with a high degree of accuracy.

(2) The control device 104 executes color correction for the edge area image so as to eliminate color differences between the two sides of the edge and determines the AF lens moving direction by using the edge area image having undergone the color correction. As a result, the AF lens moving direction can be determined with a high degree of accuracy.

(3) The control device 104 corrects the magnification chromatic aberration in the edge area image having undergone the color correction and determines the AF lens moving direction by using the edge area image having undergone the magnification chromatic aberration correction. As a result, the AF lens moving direction can be determined with a high degree of accuracy.

(4) The control device 104 corrects the magnification chromatic aberration by shifting the charts, each indicating the edge intensity level of a specific color component within the edge area image, so as to reduce the extents of offset among the individual charts corresponding to the various color components. Through these measures, the magnification chromatic aberration can be corrected quickly.

(5) If the extents of offset manifested by the charts each indicating the edge intensity level of a specific color component within the edge area image are less than a predetermined offset quantity, the control device 104 judges that the particular edge area image can be used to determine the AF lens moving direction. Thus, an optimal edge that can be used to determine the AF lens moving direction can be accurately selected.

(6) The control device 104 calculates an index value in correspondence to the edge image area, which is to be used when determining the AF lens moving direction, and determines the AF lens moving direction by comparing the index value with a threshold value. As a result, the AF lens moving direction can be determined with a high degree of accuracy.

—Variations—

It is to be noted that the camera achieved in the first embodiment as described above allows for the following variations.

(1) In the first embodiment described above, the control device 104 determines the AF lens moving direction by calculating color ratio values for the edge area image. However, the control device 104 may determine the AF lens moving direction based upon hue values or saturation values instead of the color ratio values. As a further alternative, the AF lens moving direction may be determined based upon a combination of at least two types of values among the color ratio values, the hue values and the saturation values.

(2) The threshold value used to determine the AF lens moving direction in the first embodiment described above is set in advance. However, the control device 104 may instead store the history of index values having been calculated in the past. For instance, the control device 104 may use a threshold value obtained by calculating a mean of the index values having been calculated in the past.

(3) The present invention is adopted in the camera 100 in the first embodiment described above. However, the present invention is not limited to this example and it may be adopted in another type of photographing device equipped with an autofocusing function.

Second Embodiment

As a live view image input from the image sensor 103 starts, the control device 104 in the camera 100 achieved in the second embodiment executes AF (automatic focus adjustment) processing and thus executes AF control at all times while the live view image is on display by continuously executing focus adjustment while the live view image is on display. In more specific terms, assuming that an image in each frame input from the image sensor 103 to the control device 104 is expressed with data in the RGB colorimetric system, different focus match positions are assumed on the optical axis in correspondence to the individual color components, i.e., the R color component, the G color component and the B color component, due to the variance among the axial chromatic aberrations occurring in correspondence to the individual color components. Accordingly, the current focusing condition is determined based upon a difference between edge blurring widths corresponding to two different color components between which a relationship whereby a blurring width of one color component in the edge area, which is greater than the blurring width of the other color component further frontward relative to the focus match position on the optical axis, becomes smaller than the blurring width of the other color component further backward relative to the focus match position. Then, the specific direction in which the current AF lens position is offset along the optical axis relative to the focus match position is determined so as to achieve AF control at all times while the live view image display is on. It is to be noted that a specific example of the relationship between the blurring widths of different color components in an edge area whereby the blurring width corresponding to one color component which is greater than the blurring width of the other color components further frontward relative to the focus match position along the optical axis becomes smaller than the blurring width of the other color components further backward relative to the focus match position will be described in detail later in reference to FIGS. 9A through 9C.

While the widths of blurring occurring in correspondence to the individual color components as described above in a digital camera equipped with a standard optical system (lens 102) or a standard image sensor 103, encompass a range of several pixels to several tens of pixels, the difference between the blurring widths corresponding to two different colors is equivalent to only 1/10 to 1/100 of the blurring width range of several pixels to several tens of pixels. Since this blurring width difference is smaller than the margin of error of the blurring width measurement which can only be executed in units of individual pixels, it is difficult to determine the blurring width difference accurately based directly upon the blurring width measurement results. For this reason, the control device 104 in the embodiment calculates the blurring width difference between two colors through an indirect method based upon statistical quantities each calculated in correspondence to one of different categories of pixel value groups and determines the focusing condition by ascertaining the specific direction in which the current AF lens position is offset from the focus match position along the optical axis, as detailed below.

Figure 6:
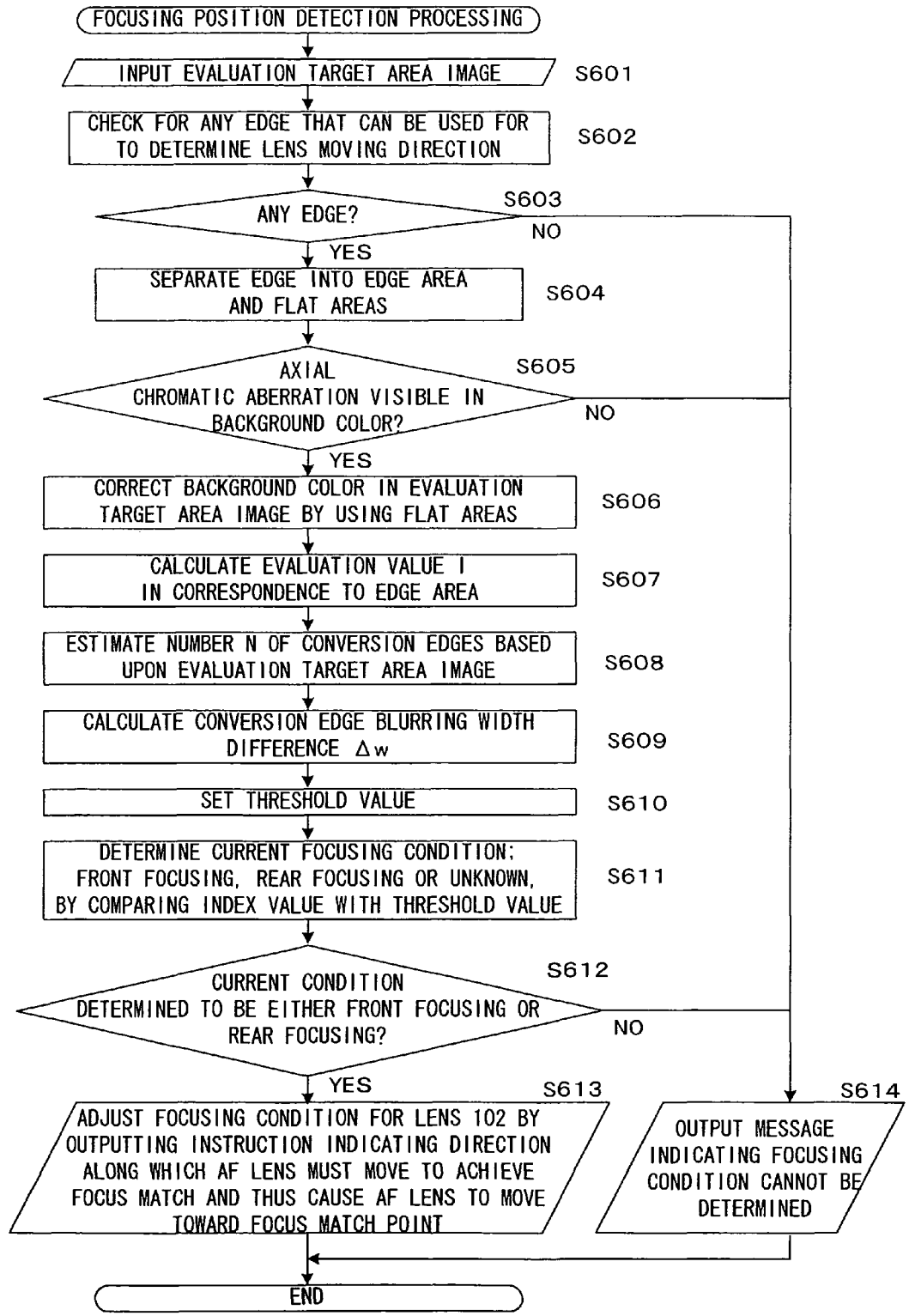
FIG. 6 presents a flowchart of the focusing position detection processing executed in a second embodiment.

FIG. 6 presents a flowchart of the focusing position detection processing executed in the second embodiment in order to enable AF control at all times while the live view image display is on. The processing in FIG. 6 is executed by the control device 104 as a program started up as a live view image input from the image sensor 103 starts. It is to be noted that the processing executed in the embodiment is described below by assuming that axial chromatic aberration manifests differently in correspondence to the R component and the G component, that a greater extent of blurring occurs in correspondence to the R component than in correspondence to the G component when focus is offset further toward the image sensor 103 relative to the focus match position on the optical axis, i.e., when rear defocusing occurs, and that a greater extent of blurring occurs in correspondence to the G component than in correspondence to the R component when focus is offset further toward the lens 102 relative to the focus match position on the optical axis, i.e., when front focusing occurs.

In step S601, the control device 104 reads out an image within an evaluation target area (evaluation target area image) within an input image provided from the image sensor 103. The evaluation target area image read out in this step may be, for instance, the image contained in an AF evaluation area set within the photographic field. The operation then proceeds to step S602 in which the control device 104 investigates the evaluation target area image so as to determine whether or not there is any edge that can be used to determine the focusing condition by executing edge detection for the evaluation target area image. Subsequently, the operation proceeds to step S603, in which the control device 104 makes a decision based upon the results of the edge detection processing having been executed in step S602 as to whether or not any edge has been detected in the evaluation target area image. If a negative decision is made in step S603, the operation proceeds to step S614, in which the control device 104 decides that the focusing condition cannot be determined and thus ends the processing. If, on the other hand, an affirmative decision is made in step S603, the operation proceeds to step S604.

In step S604, the control device 104 separates the evaluation target area image into a flat area (a flat image portion) F and an edge area (edge image portion) E based upon whether or not a gradient is present at each of the pixels constituting the evaluation target area image. In more specific terms, the control device 104 calculates gradient absolute values $g_R(x, y)$ and $g_G(x, y)$ as expressed in (1) and (2) below with $p(x, y)$ indicating each pixel in the evaluation target area image and $R(x, y)$, $G(x, y)$ and $B(x, y)$ respectively representing the R value, the G value and the B value indicated as the pixel $p(x, y)$. It is to be noted that while the gradient absolute values $g_R(x, y)$ and $g_G(x, y)$ are calculated as expressed in (1) and (2) below in the embodiment by assuming that axial chromatic aberration manifests differently in correspondence to the R component and the G component as described earlier, an axial chromatic aberration difference may occur between other color components and, in such a case, the gradient absolute values should be calculated in correspondence to those color components.

$$g_R(x, y) = \sqrt{\left(\frac{dR(x, y)}{dx}\right)^2 + \left(\frac{dR(x, y)}{dy}\right)^2} \qquad (1)$$

$$g_G(x, y) = \sqrt{\left(\frac{dG(x, y)}{dx}\right)^2 + \left(\frac{dG(x, y)}{dy}\right)^2} \qquad (2)$$

Then, the control device 104 separates the evaluation target area image into the flat area F and the edge area E by making a decision as expressed in (3) and (4) below as to whether or not a gradient exceeding a threshold value exists based upon the gradient absolute values $g_R(x, y)$ and $g_G(x, y)$ having been calculated.

$$F = \{p(x,y) | g_R(x,y) < g_{threshold} \cap g_G(x,y) < g_{threshold}\} \qquad (3)$$

$$E = \{p(x,y) | g_R(x,y) > g_{threshold} \cap g_G(x,y) > g_{threshold}\} \qquad (4)$$

The control device 104 further divides the flat area F into sub flat areas FH and FL by using the mean value $F_{mean}$ of the pixel values at the pixels belonging to the flat area F as expressed in (5) and (6) below. As a result, an edge assuming a given sectional shape, which is present within the evaluation target area image, can be approximated with a model edge expressed with the two sub flat areas FH and FL and the edge area E connecting the two sub flat areas.

$$F_L = \{p(x,y) < R(x,y) < R_{F_{mean}} \cap G(x,y) < G_{F_{mean}} \cap p(x,y) \epsilon F\} \qquad (5)$$

$$F_H = \{p(x,y) | R(x,y) > R_{F_{mean}} \cap G(x,y) > G_{F_{mean}} \cdot p(x,y) \epsilon F\} \qquad (6)$$

Figure 7A:
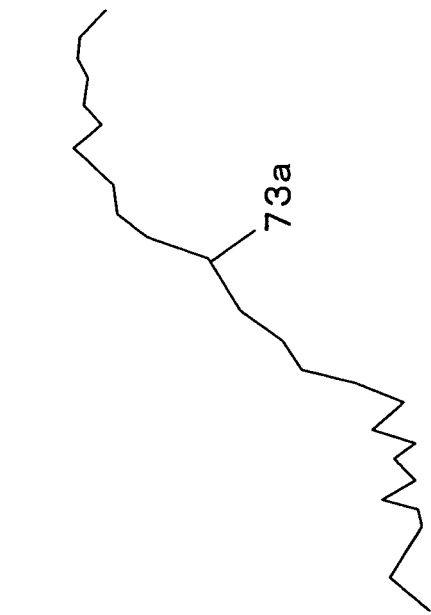
FIGS. 7A and 7B presents an example of approximation indicating how the target data may be approximated with respect to a model edge.
Figure 7B:
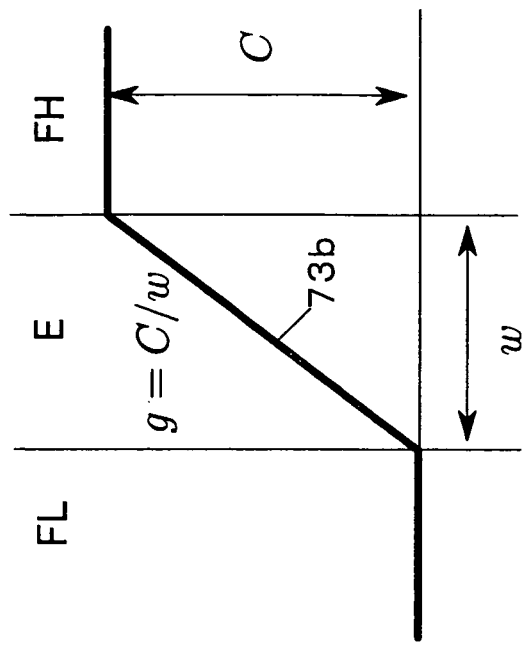

For instance, an edge 73a assuming a sectional shape such as that shown in FIG. 7A can be approximated with a model edge 73b that can be separated into two sub flat areas FL and FH, located on the two sides of the edge and manifesting a contrast difference C, and an edge area E connecting the sub flat area FL and the sub flat area FH, as shown in FIG. 7B. It is to be noted that the length w of the edge area E in the model edge 73b shown in FIG. 7B represents the blurring width of the edge. In addition, the model edge corresponding to a pixel unit length extending along the edge is to be referred to as a conversion edge.

Subsequently, the operation proceeds to step S605 in which the control device 104 ascertains the average colors in the sub flat areas FH and FL and makes a decision as to whether or not the background color manifests visible axial chromatic aberration. Namely, when axial chromatic aberration manifests differently in correspondence to the R component and the G component and also in correspondence to the R component and the B component but there is no axial chromatic aberration difference between the G component and the B component, no axial chromatic aberration will be observed as long as no contrast difference manifests with regard to the R component in the background color in the sub flat areas FH and FL even if a contrast difference manifests both in the G component and the B component in the background color. Accordingly, the control device 104 makes an affirmative decision in step S605 if a sufficient degree of contrast difference manifests in correspondence to the R component in the background color and a sufficient degree of contrast difference also manifests in correspondence to at least either the G component or the B component in the background color, but the control device 104 otherwise makes a negative decision in step S605. If a negative decision is made in step S605, the operation proceeds to step S614 having been described earlier, in which the control device 104 judges that the focusing condition cannot be determined and ends the processing. If, on the other hand, an affirmative decision is made in step S605, the operation proceeds to step S606.

Figure 8B:
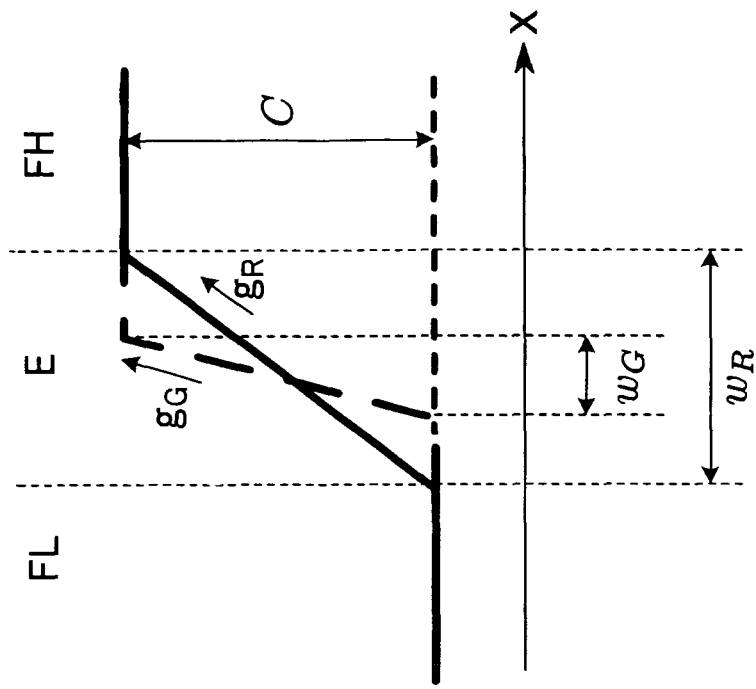
FIGS. 8A and 8B present an example of background color correction indicating how the background color in the background areas around an edge area may be corrected.
Figure 8A:
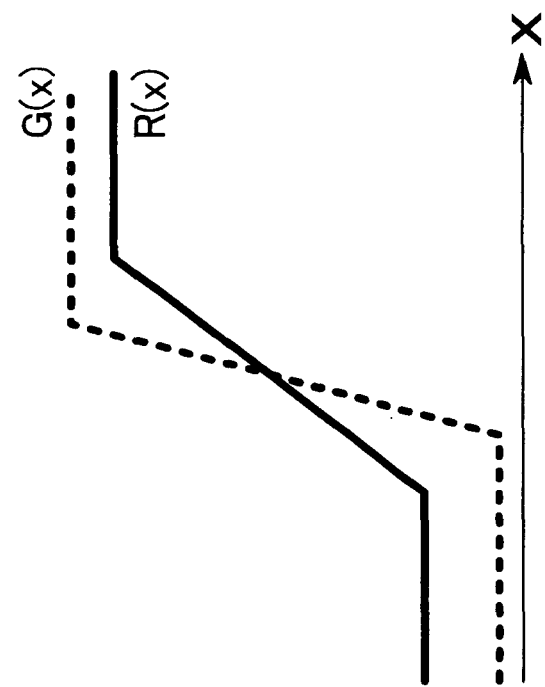

In step S606, the control device 104 corrects the overall evaluation target area image so as to render the colors of the sub flat areas FH and FL to gray. More specifically, the control device 104 normalizes the contrast differences corresponding to the R component, the G component and the B component on the two sides of the edge over the entire evaluation target area image so as to render the colors of the sub flat areas FH and FL to gray. For instance, the background color correction may be executed so that the R-component edge R(x) indicated by the solid line in FIG. 8A and the G-component edge G(x) indicated by the dotted line in FIG. 8A achieve matching contrast differences between the contrast levels on the two sides of the edge area E, as shown in FIG. 8B. The operation then proceeds to step S607.

In step S607, the control device 104 calculates an evaluation value I through a process expressed in (7) through (11) below in correspondence to the two colors among the R color, the G color and the B color manifesting an axial chromatic aberration difference, based upon the edge area E in the evaluation target area image having undergone the processing in step S606 executed to normalize the contrast differences between the contrast levels on the two sides of the edge corresponding to the individual color components. Namely, the control device 104 divides the edge area E, in the evaluation target area image having undergone the background color correction, into a sub edge area EL and a sub edge area EH by using the mean value $E_{mean}$ of the pixel values indicated at the pixels in the edge area E as a threshold value, as expressed in (7) and (8).

$$E_L = \{p(x,y) | R(x,y) < R_{E_{mean}} \cap G(x,y) < G_{E_{mean}} \cap p(x,y) \epsilon E\} \qquad (7)$$

$$E_H = \{p(x,y) | R(x,y) > R_{E_{mean}} \cap G(x,y) > G_{E_{mean}} \cap p(x,y) \epsilon E\} \qquad (8)$$

The control device 104 next calculates a color difference sum ΔAL in correspondence to the sub edge area EL, as expressed in (9) and also calculates a color difference sum ΔAH in correspondence to the sub edge area EH, as expressed in (10). It is to be noted that while the color difference sums ΔAL and ΔAH are calculated as expressed in (9) and (10) for the R-component edge and the G-component edge in the embodiment by assuming that axial chromatic aberration manifests differently for the R color component and the G color component, as explained earlier, an axial chromatic aberration difference may manifest in relation to different color components, and in such a case, color difference sums ΔAL and ΔAH should be calculated for the edges corresponding to those color components manifesting the axial chromatic aberration difference.

$$\Delta AL_{R-G} = \sum_{p(x,y) \in E_L} (R(x, y) - G(x, y)) \qquad (9)$$

$$\Delta AH_{R-G} = \sum_{p(x,y) \in E_H} (R(x, y) - G(x, y)) \qquad (10)$$

The control device 104 further calculates the evaluation value I in conjunction with the two colors manifesting axial chromatic aberration, i.e., R and G as expressed in (11) below. The evaluation value I is compared with the value calculated as expressed in (23), which is to be described in detail later, to determine the number of edges manifesting a conversion edge blurring width difference Δw present within the evaluation target area image. It is to be noted that the evaluation value I, calculated simply by grouping pixel values into hierarchical pixel aggregates based upon statistical quantities without assuming any specific edge shape within the evaluation target area image can be calculated as expressed in (11) below in correspondence to any evaluation target area image.

$$I_{R-G} = -\frac{4}{C}(\Delta AH_{R-G} - \Delta AL_{R-G}) \quad (11)$$

The operation then proceeds to step S608, in which the control device 104 roughly estimates the number N of the conversion edges (conversion edge quantity) present within the evaluation target area image. The control device 104 may roughly estimate the conversion edge quantity N by, for instance, binarizing the evaluation target area image in reference to the $E_{mean}$ value mentioned earlier and counting the pixels defining boundaries. Subsequently, the operation proceeds to step S609.

In step S609, the control device 104 calculates a conversion edge blurring width difference Δw to be used when determining the specific direction in which the current AF lens position is offset relative to the focus match position along the optical axis. Since a relationship expressed as; I=Δw×N exists among the evaluation value I calculated as expressed in (11), the conversion edge quantity N and the conversion edge blurring width difference Δw, the control device 104 is able to calculate the conversion edge blurring width difference Δw as expressed in (12) below.

$$\Delta w = I/N \quad (12)$$

Through this process, the conversion edge blurring width difference Δw can be indirectly calculated based upon the evaluation target area image containing an edge assuming any shape. It is to be noted that the conversion edge blurring width difference Δw calculated in this step, which is the conversion edge blurring width difference between the R component and the G component manifesting variance in the axial chromatic aberration, may be notated as; conversion edge blurring width difference $\Delta w_{R-G}$.

The operation then proceeds to step S610, in which the control device 104 sets a threshold value to be used as a criterion when determining the AF lens moving direction based upon the conversion edge blurring width difference Δw. It is to be noted that the conversion edge blurring width difference Δw calculated when the AF lens takes a position closer to the focus match position assumes a value closer to 0. Accordingly, the AF lens may be judged to be at the focus match position when the conversion edge blurring width difference Δw is equal to 0, and the direction along which the conversion edge blurring width difference Δw becomes closer to 0 may be judged to be the AF lens moving direction when the conversion edge blurring width difference Δw takes a value other than 0. However, a specific threshold value is set in step S610 in the embodiment in order to avoid erroneous judgment that may otherwise occur within certain ranges preceding and beyond the focus match position due to measurement error by conceding that the AF lens is at the focus match position, as long as the conversion edge blurring width difference Δw is within a specific range centered on 0. It is to be noted that a predetermined constant may be set as the threshold value or an optimal threshold value may be set based upon the particulars of the image, the photographing conditions and the like.

Subsequently, the operation proceeds to step S611, in which the control device 104 compares the conversion edge blurring width difference Δw calculated in step S609 with the threshold value and makes a decision as to whether the current focusing condition is a front focusing condition or a rear focusing condition. Namely, assuming that the threshold value is set so as to determine the AF lens to be in the focus match condition when the conversion edge blurring width difference Δw is within a range between −0.5 and 0.5, the control device 104 decides that the AF lens is in a rear focusing condition if the conversion edge blurring width difference Δw is greater than 0.5 and decides that the AF lens is in a front focusing condition if the conversion edge blurring width difference Δw is less than −0.5.

Figure 9A:
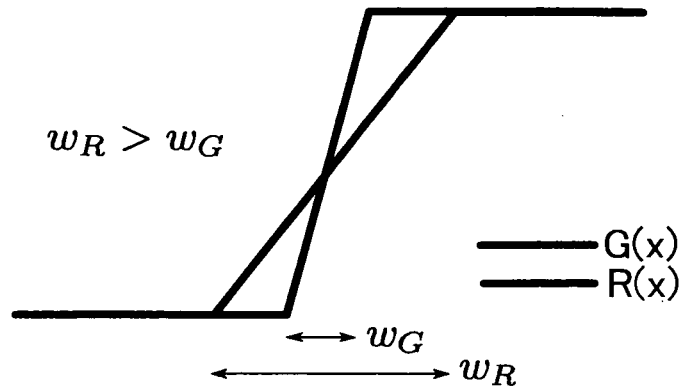
FIGS. 9A through 9C each show how the focusing condition may be determined.

For instance, in terms of the R-component edge R(x) and the G-component edge G(x) resulting from the normalization in FIG. 8B, the R-component edge will be blurred to a greater extent than the G-component edge in the rear focusing condition. Thus, a relationship expressed as; $w_R > w_G$ will exist between the length $w_R$ of the R-component edge area E and the length $w_G$ of the G-component edge area E, as indicated in FIG. 9A under such circumstances. Accordingly, the control device 104 will decide that the AF lens is currently in the rear focusing condition if the conversion edge blurring width difference Δw ($=w_R-w_G$) is greater than 0.5, i.e., the upper limit threshold value.

Figure 9B:
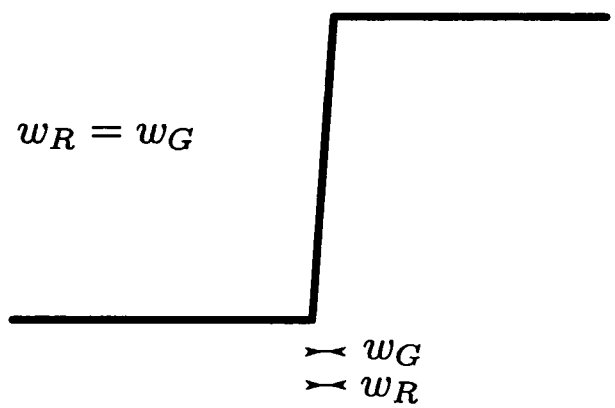
Figure 9C:
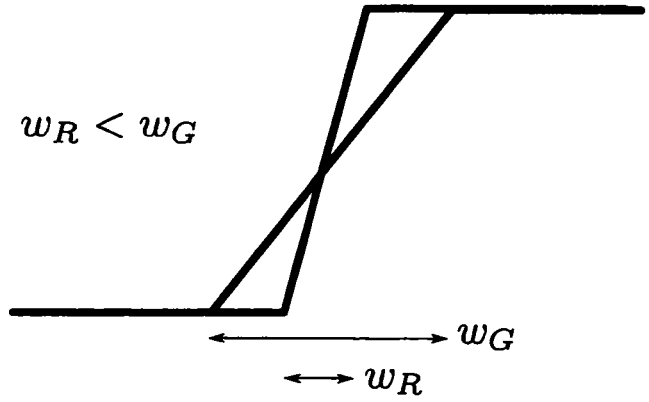

The G-component edge will be blurred to a greater extent than the R-component edge in the front focusing condition. Thus, a relationship expressed as; $w_R < w_G$ will exist between the length $w_R$ of the R-component edge area E and the length $w_G$ of the G-component edge area E, as indicated in FIG. 9C under such circumstances. Accordingly, the control device 104 will decide that the AF lens is currently in the front focusing condition if the conversion edge blurring width difference Δw ($=w_R-w_G$) is smaller than −0.5, i.e., the lower limit threshold value.

However, a relationship expressed as; $w_R = w_G$ will exist between the length $w_R$ of the R-component edge area E and the length $w_G$ of the G-component edge area E in the focus match condition, as indicated in FIG. 9B. Accordingly, when Δw ($=w_R-w_G$) is greater than the lower limit threshold value −0.5 and less than the upper limit threshold value 0.5, the control device 104 will determine the current condition to be the focus match condition, i.e., it cannot be clearly judged to be either a front focusing condition or a rear focusing condition.

The operation subsequently proceeds to step S612, in which the control device 104 judges whether or not the decision-making results obtained through step S611 indicate either the front focusing condition or the rear focusing condition. If a negative decision is made in step S612, the operation proceeds to step S614, in which the control device 104 decides that the focusing condition cannot be determined and ends the processing. If, on the other hand, an affirmative decision is made in step S612, the operation proceeds to step S613.

In step S613, the control device 104 determines the AF lens moving direction by ascertaining, based upon the decision-making results obtained through step S611, the direction along which the conversion edge blurring width difference Δw becomes closer to 0. The control device 104 then causes the AF lens to move along the focus matching direction so as to adjust the focus of the lens 102 by outputting an instruction for the motor 107, which drives the AF lens, indicating the AF lens moving direction having been determined. The processing then ends.

The following advantages are achieved through the second embodiment described above. (1) The control device 104 detects an edge in the evaluation target area image in correspondence to each color component, calculates a conversion edge blurring width difference $\Delta w$ between the edges corresponding to two color components manifesting the axial chromatic aberration and determines the focusing condition based upon the conversion edge blurring width difference $\Delta w$. As a result, the focusing condition can be determined accurately.

(2) The control device 104 groups the edge data corresponding to the two color components manifesting the axial chromatic aberration into flat areas F and an edge area E and calculates an evaluation value I based upon color difference sums calculated for the edge area E. The control device 104 then calculates a conversion edge blurring width difference $\Delta w$ as expressed in (12) by using the evaluation value I having been calculated. Through this process, the conversion edge blurring width difference $\Delta w$ can be calculated even when the shape of the edge cannot be clearly determined.

(3) The control device 104 executes correction so as to eliminate any variance in the contrast difference across the edge in relation to the two color components manifesting the axial chromatic aberration and calculates the conversion edge blurring width difference $\Delta w$ by using the evaluation target area image having undergone the correction. Thus, the conversion edge blurring width difference $\Delta w$ can be calculated more accurately.

Third Embodiment

In the second embodiment described above, the conversion edge blurring width difference $\Delta w$ is calculated for different color component edges corresponding to two color components manifesting axial chromatic aberration and the focusing condition is determined based upon the conversion edge blurring width difference $\Delta w$. While axial chromatic aberration causes varying extents of blurring in correspondence to the individual color components, there is an additional factor that may need to be considered, i.e., a change in the levels of resolution corresponding to the individual color components relative to one another, attributable to the processing executed during input image generation, may alter the blurring extents and the blurring width difference between the color components.

Such a situation may arise, for instance, in an image-capturing device that generates an image by interpolating a raw image read out from a single-chip color image sensor when a raw image read from the image sensor through a pixel sum read is interpolated via an interpolation device that executes interpolation without factoring in the fact that the raw image has been obtained through the pixel sum read. More specifically, a pixel sum read is executed to reduce the image size for purposes of frame rate improvement when executing focusing operation through contrast AF by using an image output from the image sensor that has captured the particular image. However, cost-related restrictions may give rise to a situation in which an interpolation device capable only of interpolating photographic images, which is not necessarily optimized for interpolation of the image read out through the pixel sum read to be used in the focusing operation, is used to interpolate the image. Under these circumstances, if the pixel array in the single-chip color image sensor does not achieve a uniform color component distribution commonly for all color components in relation to pixel summing, a change may occur in the relative levels of resolution corresponding to the individual color components along the vertical, horizontal and diagonal directions at each of the pixels constituting the image generated through the interpolation.

For instance, assuming that the image is read through a same-color 2×2 pixel sum average read from an image sensor with the most common Bayer array, i.e., the RGGB four-color Bayer array, a reduced Bayer array raw image with a similar array to that of the initial Bayer array raw image is generated through the pixel sum read. However, the gravitational centers of the sampling positions in the optical image formed on the image sensor and the pixel positions on the image data become offset from each other, as indicated in FIGS. 10A and 10B.

Figures 10A, 10B:
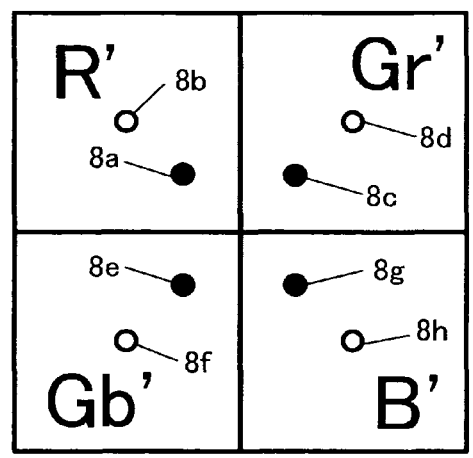
FIGS. 10A and 10B indicate how the sampling positions of pixel signals read through a 2×2 pixel sum read, may be offset.

The reduced Bayer array raw image in FIG. 10B is obtained through same-color 2×2 pixel sum average read from the raw image initially formed on the image sensor with the Bayer array shown in FIG. 10A. As FIG. 10B indicates, points 8b, 8d, 8f and 8h indicating pixel positions on the reduced Bayer array raw image are respectively offset relative to points 8a, 8c, 8e and 8g at which the initial raw image is sampled. In other words, the pixel position 8b of the R' pixel in the reduced Bayer array raw image is offset relative to the gravitational center of the R pixel sampling positions on the initial Bayer array raw image, i.e., relative to the position 8a of the gravitational center of the four R pixels. Likewise, the pixel position 8d of the Gr' pixel in the reduced Bayer array raw image is offset relative to the gravitational center of the Gr pixel sampling positions on the initial Bayer array raw image, i.e., relative to the position 8c of the gravitational center of the four Gr pixels. The pixel position 8f of the Gb' pixel in the reduced Bayer array raw image is offset relative to the gravitational center of the Gb pixel sampling positions on the initial Bayer array raw image, i.e., relative to the position 8e of the gravitational center of the four Gb pixels. The pixel position 8h of the B' pixel in the reduced Bayer array raw image is offset relative to the gravitational center of the B pixel sampling positions on the initial Bayer array raw image, i.e., relative to the position 8g of the gravitational center of the four B pixels.

If interpolation processing identical to processing that would be executed for the initial Bayer array raw image is executed by an interpolation device without factoring in the sampling position offset which is a phenomenon dependent upon the color of the reduced Bayer array raw image, an image manifesting color artifacts or altered relative resolution levels among the various color components depending upon the offset direction relative to the Bayer array will be generated. If the focusing position is determined based upon the edge blurring width difference between two color components attributable to the axial chromatic aberration, as has been described in reference to the second embodiment, the change will occur in the edge blurring width difference between the two colors, the measurement of which is dependent upon the direction of the edge contained in the image. Such a change will necessitate the focus position decision-making through comparison with a reference value representing the focus match condition to be executed in correspondence to each of varying conditions based upon the dependency of the change and will compromise the decision-making accuracy. In addition, if the edge position rotates during an operation executed to determine the focusing condition based upon axial chromatic aberration while tracking a moving photographic subject or while video shooting is in progress, the reference value used as a criterion in determining the focusing condition will change and, in such a case, stable determination results may not be achieved. In other words, changes occurring in the relative resolution levels corresponding to the individual color components must be taken into consideration in correspondence to various directions along which edges may extend.

This issue is addressed in the third embodiment as described below, by adopting a method for determining the focusing position with high accuracy based upon axial chromatic aberration through exclusive use of specific combinations of pixels selected in a raw image or an interpolated image in correspondence to the direction of each edge, which will remain unaffected by any change in the relative resolution levels corresponding to the individual color components even when interpolation processing causes the input image to manifest, other than the axial chromatic aberration, changes in the relative resolution levels corresponding to the various color components.

Figure 11:
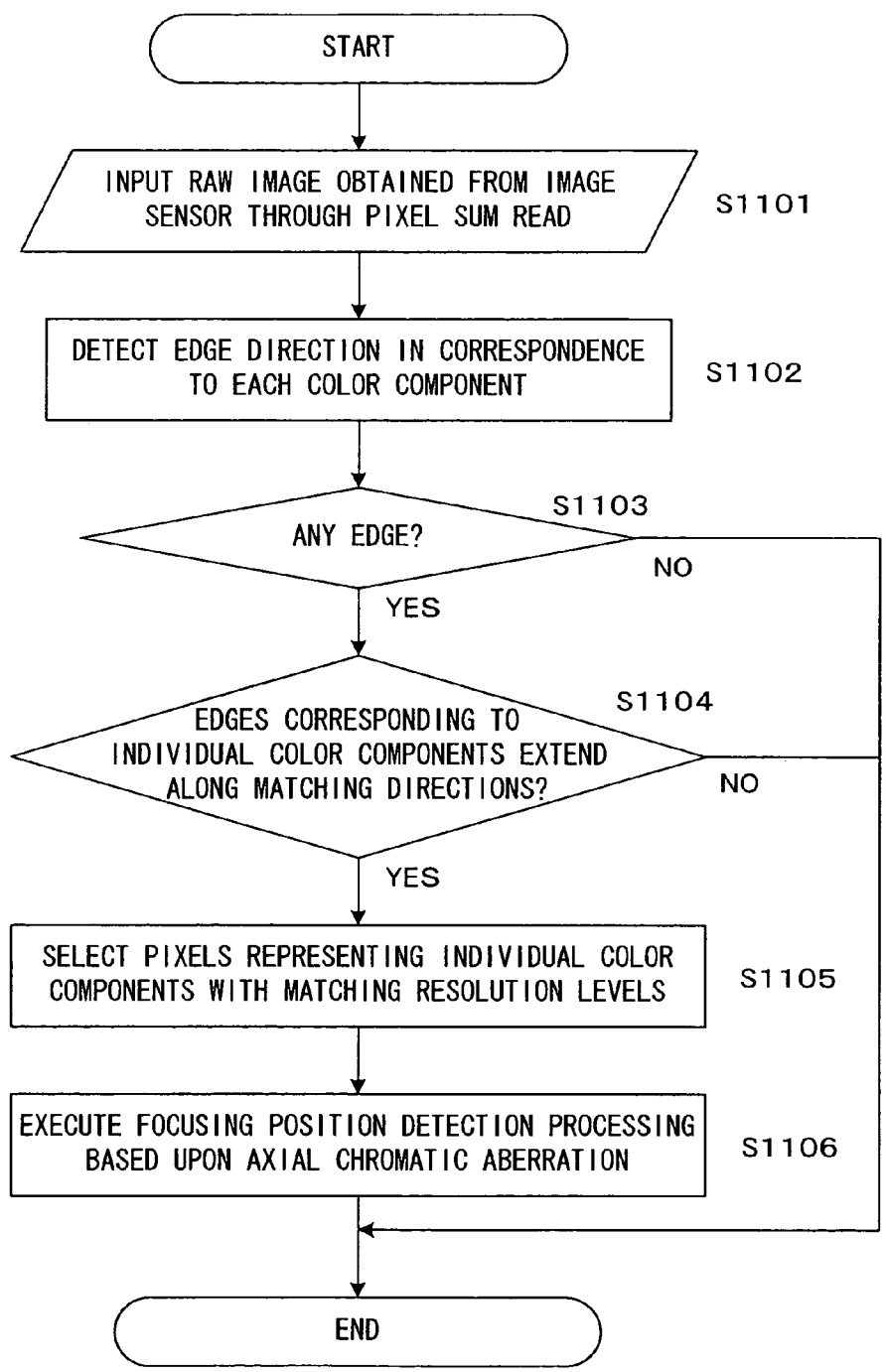
FIG. 11 presents a flowchart of the focusing position detection processing executed in a third embodiment.

The flow of the processing executed in the third embodiment when a change in the relative resolution levels of the individual color components, which is dependent on the edge direction, occurs as a result of a pixel sum read and interpolation, is described next. FIG. 11 presents a flowchart of the focusing position detection processing executed in the third embodiment.

In step S1101, the control device 104 obtains a reduced Bayer array raw image by reading an image through the 2×2 pixel sum read from an image sensor assuming a Bayer array made up with four different types of color filters, i.e., R, Gr, Gb and B. As shown in FIG. 10B, the pixel positions of the pixels constituting the reduced Bayer array raw image assumed on the image data expressing the reduced Bayer array raw image, are offset relative to the gravitational centers of the sampling positions at which the pixels corresponding to the individual color components are sampled in the initial image. For this reason, unless the interpolation device factors in the pixel sum read, an image manifesting a change in the relative resolution levels corresponding to the individual color components depending upon the edge direction, will be generated. Accordingly, the operation directly proceeds to step S1102 without executing interpolation, so as to avoid any undesirable outcome.

In step S1102, the control device 104 detects edge directions each in correspondence to one of the four color components, i.e., R, Gr, Gb and B, in the reduced Bayer array raw image. Four different filters, such as those shown in FIGS. 13A, 13B, 13C and 13D, for instance, may be used in conjunction with a reduced Bayer array raw image such as that shown in FIG. 12 so as to calculate a same-color pixel gradient in correspondence to each pixel and take a total sum in correspondence to the entire image for purposes of comparison. Through this process, one of eight different directions can be detected as the edge direction in correspondence to each color component based upon the sign of the edge gradient and the direction in which the largest absolute value is achieved.

The operation then proceeds to step S1103, in which the control device 104 makes a decision as to whether or not any edge is present within the reduced Bayer array raw image based upon the edge direction detection results obtained through step S1102. For instance, if the gradients are very small and no edge is detected in step S1102, the control device 104 decides that there is no edge present within the reduced Bayer array raw image. If a negative decision is made in step S1103, the reduced Bayer array raw image obtained in step S1101 is judged to be not suited to be used to determine the focusing position based upon axial chromatic aberration and the control device immediately ends the processing. If, on the other hand, an affirmative decision is made in step S1103, the operation proceeds to step S1104.

In step S1104, the control device 104 makes a decision as to whether or not the edge directions detected in correspondence to the individual color components within the reduced Bayer array raw image match one another based upon the edge direction detection results obtained through step S1102. If a negative decision is made in step S1104, the reduced Bayer array raw image obtained in step S1101 is judged to be not suited to be used to determine the focusing position based upon axial chromatic aberration and the control device ends the processing. If an affirmative decision is made in step S1104, the reduced Bayer array raw image obtained in step S1101 is judged to be usable in determining the focusing position based upon axial chromatic aberration and the operation proceeds to step S1105.

In step S1105, the control device 104 selects pixels with matching resolution levels and sampling positions among the individual color components in correspondence to the edge directions detected in step S1102. Based upon the relationship indicated in FIGS. 9A through 9C, the focusing position is determined based upon the axial chromatic aberration by comparing the blurring width difference between the R component and the G component, the blurring width difference between the G component and the B component and the blurring width difference between the R component and the B component with the reference value corresponding to the focus match condition and final decision-making results are obtained by individually weighting the two color component blurring width difference results corresponding to the three sets of color combinations.

Figure 14A:
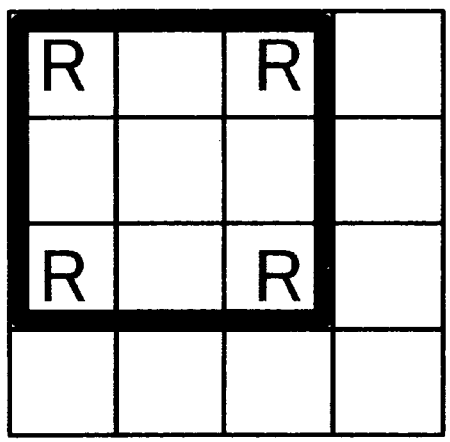
FIGS. 14A through 14C each indicate a pixel referencing range from which pixels in initial image data are referenced for the 2×2 pixel summing operation.
Figure 14B:
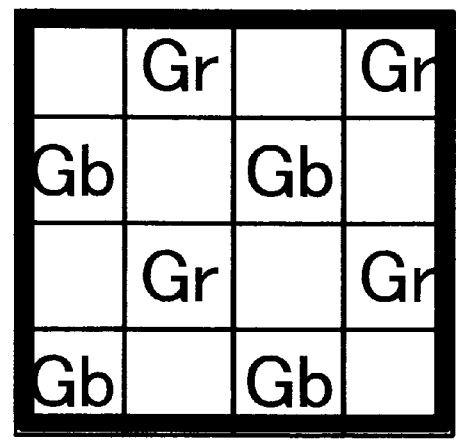

While a G-plane image is normally generated by using both Gr data and Gb data when interpolating a Bayer array raw image captured via four different types of color filters, i.e., R filters, Gr filters, Gb filters and B filters, the Gr data and the Gb data are handled discriminately in the embodiment for the following reason. Namely, R pixels are referenced over a 3×3 pixel referencing range in the initial Bayer array raw image, as shown in FIG. 14A to obtain R' pixel data in the reduced Bayer array raw image through the pixel summing operation shown in FIG. 10B, whereas Gr+Gb pixels are referenced over a 4×4 pixel referencing range in the initial Bayer array raw image, as shown in FIG. 14B, to generate Gr'+Gb' pixel data in the reduced Bayer array raw image. Thus, if the Gr'+Gb' pixel data are handled as a G pixel, the resolution of the G component becomes slightly lowered relative to the resolution of the R component, which will adversely affect the accuracy of the measurement of a slight difference in the blurring width attributable to axial chromatic aberration.

Figure 14C:
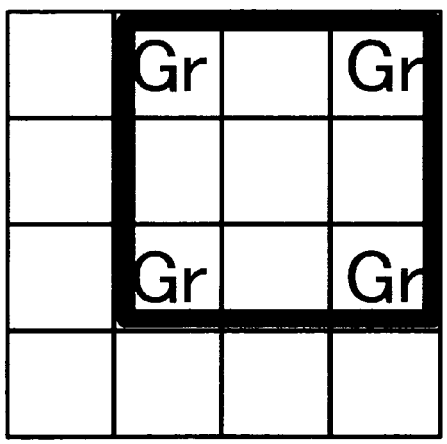

If, on the other hand, the Gr' data and Gb' data are handled as different types of data, Gr pixels, for instance, will be referenced over a 3×3 pixel referencing range in the initial raw image, as shown in FIG. 14C, to generate the Gr' pixel data in the reduced Bayer array raw image. Since this referencing range matches the R pixel referencing range, matching resolution will be achieved.

The control device 104 next selects a combination of specific pixels to be used in determining the focusing position, in correspondence to each combination of two color components in conjunction with which the focusing position is to be determined based upon axial chromatic aberration in reference to the edge direction. Such combinations of pixels are selected for each of three different scenarios, i.e., (Case 1) to (Case 3) in the embodiment.

(Case 1) When an edge runs along the horizontal direction, as shown in FIGS. 15A and 15B, R pixels and Gr pixels are selected as shown in FIG. 15C for an R and G combination and Gb pixels and B pixels are selected as shown in FIG. 15D for a G and B combination. The R and G pixels selected for the R and G combination and the G and B pixels selected for the G and B combination, as described above, achieve uniformity both in the resolution and the sampling positions along the direction intersecting the horizontal edge, as shown in FIGS. 15C and 15D. In this situation, while matching resolution will be achieved for the R and B pixels selected in an R and B combination, their sampling positions will be offset. For this reason, the results obtained by selecting the R and B pixels in the R and B combination should not be used, or the R and B combination results should be used by applying a lower weight compared to that applied to the R and G combination results and the G and B combination results.

(Case 2) When an edge runs along the vertical direction, as shown in FIGS. 16A and 16B, R pixels and Gb pixels are selected as shown in FIG. 16C for an R and G combination and Gr pixels and B pixels are selected as shown in FIG. 16D for a G and B combination. The R and G pixels selected for the R and G combination and the G and B pixels selected for the G and B combination, as described above, achieve uniformity both in the resolution and the sampling positions along the direction intersecting the vertical edge, as shown in FIGS. 16C and 16D. In this situation, while matching resolution will be achieved for the R and B pixels selected in an R and B combination, their sampling positions will be offset, as in (Case 1) described above. For this reason, the results obtained by selecting the R and B pixels in the R and B combination should not be used, or the R and B combination results should be used by applying a lower weight compared to that applied to the R and G combination results and the G and B combination results.

(Case 3) When an edge runs along a diagonal direction, as shown in FIGS. 17A to 17D, matching resolution and matching sampling positions can be achieved for the R component and the B component by selecting R pixels and B pixels in combination as shown in FIG. 17E. In this case, while sampling positions corresponding to the R and G combination and sampling positions corresponding to the G and B combination are offset, matching resolution can be achieved simply by referencing only either the Gr pixels or the Gb pixels. For this reason, the results obtained by selecting pixels in the R and G combination and the G and B combination should not be used, or R and G combination results and the G and B combination results should be used by applying a lower weight than the weight applied to the R and B combination results.

Subsequently, the operation proceeds to step S1106, in which the control device 104 determines the focusing position based upon the axial chromatic aberration by using the set(s) of pixels selected in step S1105, before ending the processing. In more specific terms, the control device 104 executes the processing in steps S604 through S614 in FIG. 6, in reference to which the second embodiment has been described, for each set of pixels selected in step S1105. Namely, while the processing executed in the second embodiment has been described by assuming that axial chromatic aberration manifests differently for the R component and the G component, the processing in steps S604 through S614 in FIG. 6 is executed in the embodiment for the set(s) of pixels selected in step S605, instead of for the combination of R and G pixels.

The following advantages are achieved through the third embodiment described above.

The control device 104 selects a specific combination of pixels in correspondence to the direction of an edge present in the input image, so as to achieve uniformity in the resolution manifesting a variance due to a factor other than axial chromatic aberration. As a result, the index value representing the focusing condition, used as the threshold to determine the focusing condition based upon the edge blurring width difference between two color components attributable to axial chromatic aberration independently of the particulars of the edge conditions in the input image, can be adjusted and thus, the accuracy of focusing position detection executed by comparing an index value on focusing position detection with the index value representing the focusing condition can be improved. In addition, since focusing operation can be executed in a camera engaged in subject tracking or video shooting by using a fixed index value representing the focusing condition, which remains unchanged even if the edge direction rotates due to a displacement of the subject within the input image or even if the subject color changes due to a change in lighting, reliable focus adjustment is enabled through focusing condition detection executed based upon stable axial chromatic aberration. In addition, there are secondary advantages that can be achieved, i.e., a smaller volume of pixel data to be handled, achieved through selective use of specific pixels, and higher speed achieved for the focusing position detection processing since the need for interpolation processing is eliminated and thus the calculation cost is reduced.

Fourth Embodiment

In reference to the fourth embodiment, a method for determining the focusing position with a high level of accuracy based upon axial chromatic aberration by executing simple correction processing for the input image even when changes in the relative resolution levels corresponding to the individual color components, other than the axial chromatic aberration, manifests in the input image, is described. In the embodiment, correction processing through which the change in the relative resolution levels corresponding to the individual color components occurring in the image used for purposes of determining the focusing position is canceled out, is determined in advance and the focusing position is determined in conjunction with the input image having been corrected through this correction processing executed prior to the focusing position determining operation.

Figure 18:
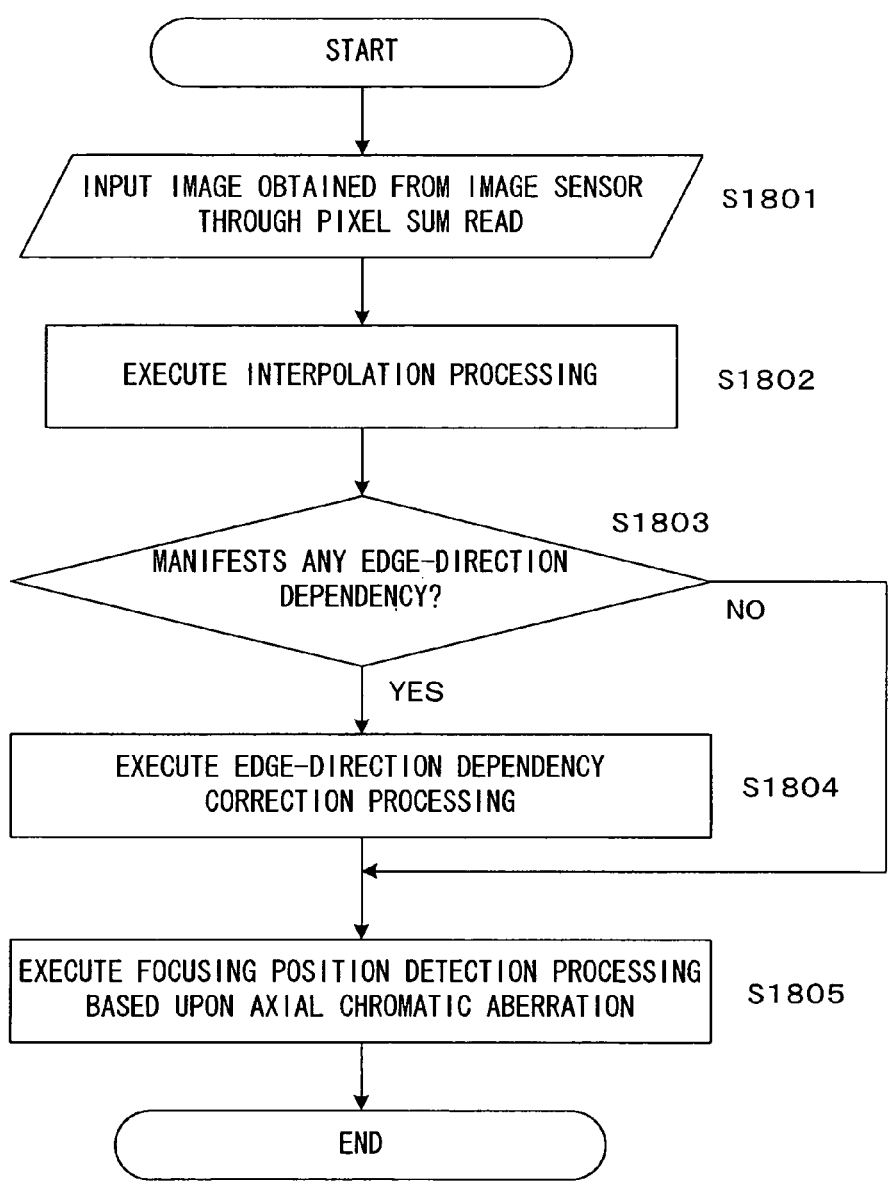
FIG. 18 presents a flowchart of the focusing position detection processing executed in a fourth embodiment.

The flow of the processing executed in the fourth embodiment is described by assuming that a change in the relative resolution levels corresponding to the individual color components, attributable to the pixel sum read and interpolation, occurs depending upon the edge direction. FIG. 18 presents a flowchart of the focusing position detection processing executed in the fourth embodiment.

In step S1801, the control device 104 reads out an image from the image sensor assuming a Bayer array through a pixel summing operation. The operation then proceeds to step S1802, in which the control device 104 executes interpolation processing for the image read out in step S1801. In this situation, unless the interpolation device factors in the pixel sum read, an image manifesting a change in the relative resolution levels corresponding to the individual color components depending upon the edge direction will be generated.

Figure 19A:
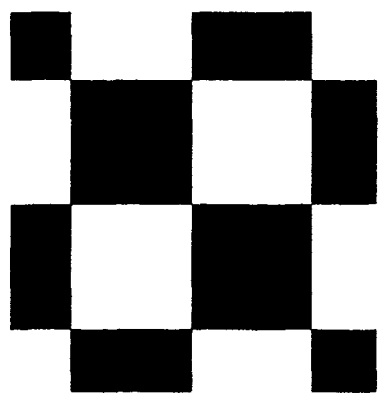
FIGS. 19A and 19B show chart images photographed for use when determining whether or not to execute the correction processing.
Figure 19B:
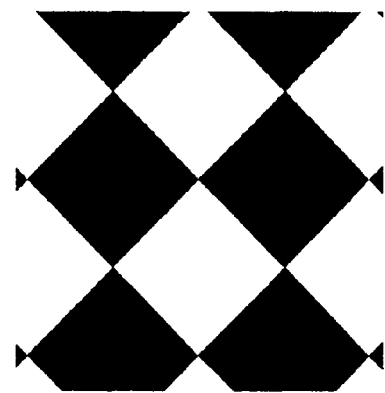

Subsequently, the operation proceeds to step S1803, in which the control device 104 makes a decision as to whether or not the input image manifests any edge-direction dependency. In the embodiment, any edge-direction dependency that the input image may manifest is investigated in advance based upon a specific combination of the particular image sensor, the particular interpolation device, the particular image processing and the like used to generate the input image to undergo the focusing position detection processing executed based upon axial chromatic aberration according to the present invention and the particulars of the pixel sum read drive. For instance, images of a black-and-white checkered pattern set squarely and at an angle relative to the pixel array, as shown in FIGS. 19A and 19B, may be photographed in the focus match condition through contrast AF or the like so as to ascertain any edge-direction dependency of the input image and the decision-making in step S1803 may be executed based upon the results of this investigation.

If a negative decision is made in step S1803, no processing is required to correct edge-direction dependency of the input image and accordingly, the operation proceeds to step S1805, which will be described in detail later. If, on the other hand, an affirmative decision is made in step S1803, it is judged necessary to execute processing for correcting the edge-direction dependency of the input image and the operation proceeds to step S1804. In step S1804, the control device 104 processes the image having undergone the interpolation processing in step S1802, so as to correct the edge-direction dependency of the resolution in the input image. In more specific terms, the following processing is executed.

First, the control device 104 calculates an edge blurring width difference $\Delta\omega$ between two color components in correspondence to each edge direction through a method identical to that adopted in the axial chromatic aberration-based focusing position detection processing. The following description is given by assuming that the focusing condition is determined based upon axial chromatic aberration manifested differently for the R color component and the G color component. Based upon an image obtained by photographing the charts in the focus match condition, the control device 104 calculates the edge blurring width difference $\Delta\omega_{AF}(R-G)$ between the R color component and the G color component. In this situation, the relationship expressed as; $\Delta\omega_{AF}(R-G)=\omega_{AF\_}R-\omega_{AF\_}G$ exists with $•_{AF\_}R$ representing the R blurring width and $\omega_{AF\_}G$ representing the G blurring width in the focusing condition.

Figure 20:
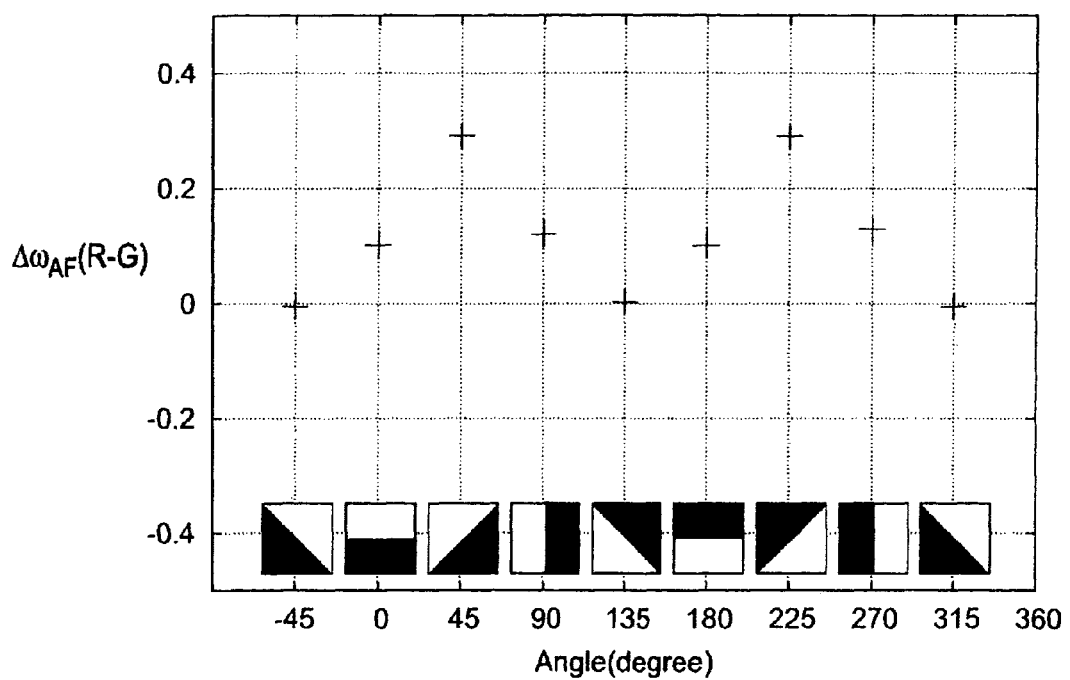
FIG. 20 shows how the extent of the focus match reference value offset may change depending upon the direction of the edge.
Figures 21A, 21B:
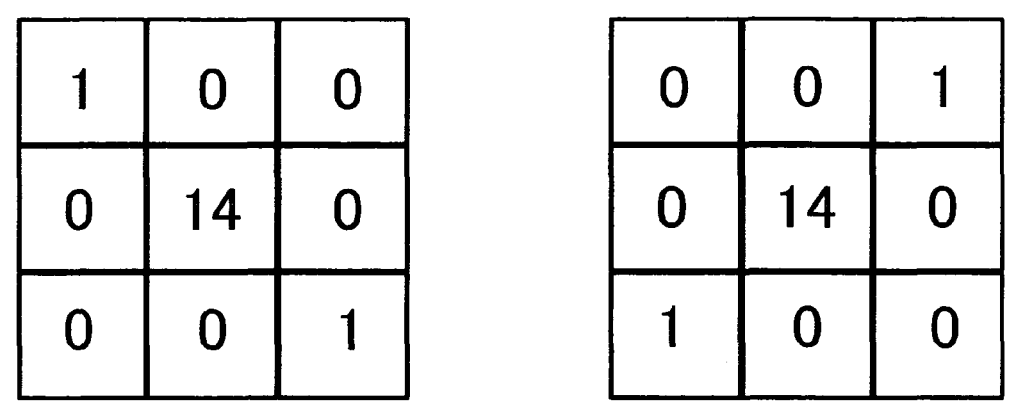
Figure 22A:
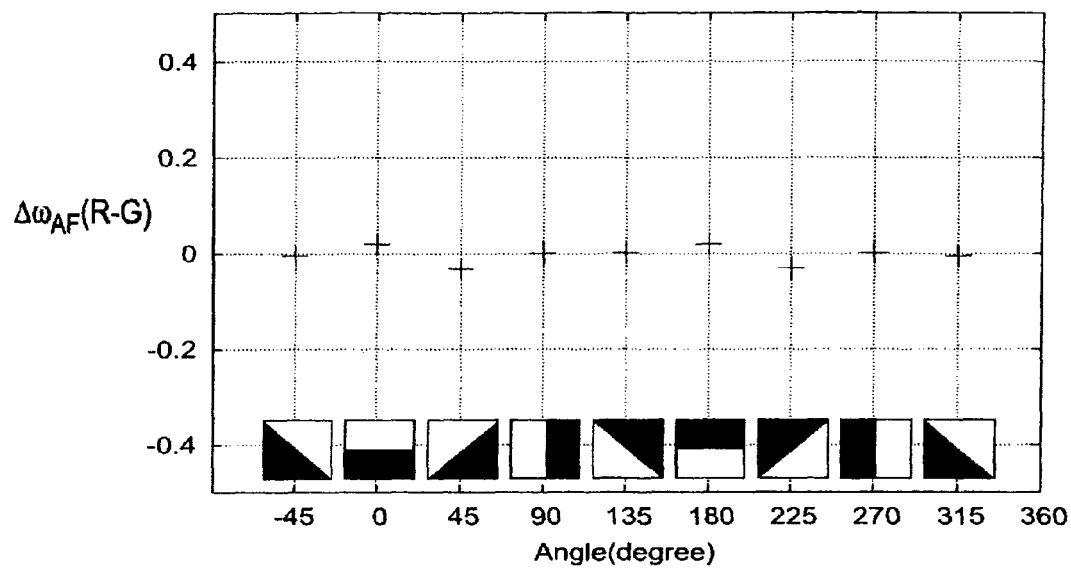
FIGS. 22A and 22B each show how the extent of the focus match reference value offset may change depending upon the direction of the edge.

FIG. 20 presents an example of results that may be obtained by plotting an edge direction-dependent change in $\Delta\omega_{AF}(R-G)$. In the example presented in FIG. 20, the results obtained by calculating $\Delta\omega_{AF}(R-G)$ along eight edge directions, i.e., along the vertical directions, along the horizontal directions and along the diagonal directions, are plotted. FIG. 20 indicates that $\Delta\omega_{AF}(R-G)$ changes along the positive direction relative to 0.0 when the edge angle relative to the image sensor array is around 45° and 225°. Both edges extend from an upper right point toward a lower left point on the image. The fact that $\Delta\omega_{AF}(R-G)$ corresponding to edges extending along this particular direction changes in the positive direction can be interpreted to be a result of an increase in $\omega_{AF\_}R$ attributable to a decrease in the R resolution occurring along the direction extending from an upper left point toward a lower right point, perpendicular to the direction along which the edges described above extend. This condition may be corrected by applying, for instance, a 3×3 smoothing filter such as that shown in FIG. 21A to the G color component alone, so as to lower the G resolution along the direction from the upper left to the lower right to a level matching the R resolution through smoothing. Through this correction, the edge direction-dependent change of $\Delta\omega_{AF}(R-G)$ will be corrected as shown in FIG. 22A. As a result, with the edge direction-dependent fluctuation of $\Delta\omega_{AF}(R-G)$ thus eliminated, focusing position detection processing in step S1805 can be executed by comparing the edge blurring width difference $\Delta\omega_{AF}(R-G)$ corresponding to any edge, regardless of its direction, with a reference value $\Delta\omega_{AF}(R-G)=0.0$.

Figure 22B:
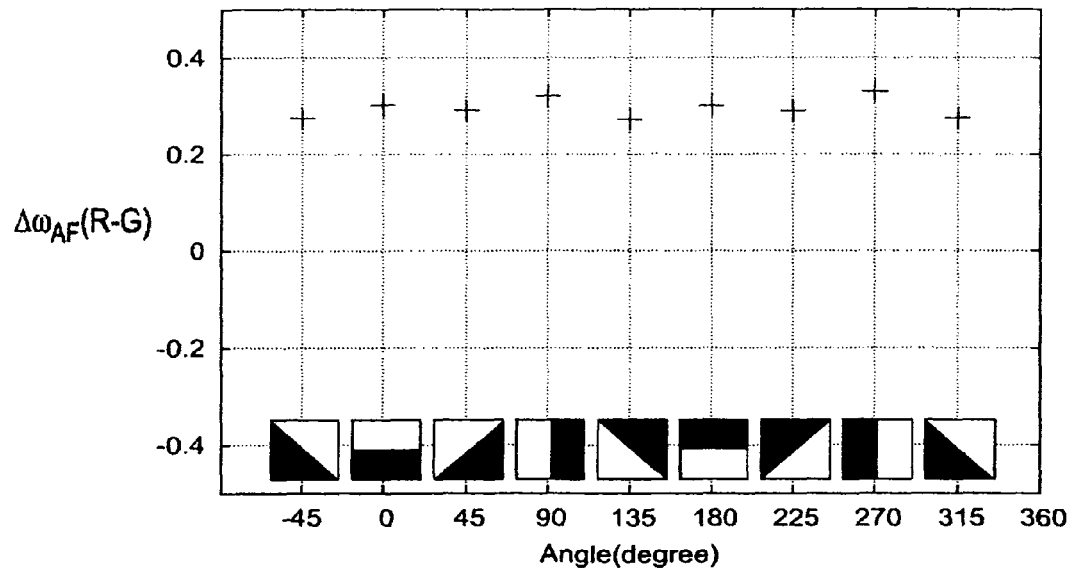

The data presented in FIG. 20 allow for another interpretation. Namely, $\Delta\omega_{AF}(R-G)$ changes along the negative direction relative to 0.3 when the edge angle relative to the image sensor array is around 135° and 315°(=−45°). In this case, both edges extend from an upper left point toward a lower right point on the image. The fact that $\Delta\omega_{AF}(R-G)$ corresponding to edges extending along this particular direction changes in the negative direction can be interpreted to be a result of an increase in $\omega_{AF\_}G$ attributable to a decrease in the G resolution occurring along the direction extending from an upper right point toward a lower left point, perpendicular to the direction along which the edges described above extend. This condition may be corrected by applying, for instance, the 3×3 smoothing filter shown in FIG. 21B to the R color component alone, so as to lower the R resolution along the direction from the upper right to the lower left to a level matching the G resolution through smoothing. Through this correction, the edge direction-dependent change of $\Delta\omega_{AF}(R-G)$ will be corrected as shown in FIG. 22B. As a result, with the edge direction-dependent fluctuation of $\Delta\omega_{AF}(R-G)$ thus eliminated, focusing position detection processing in step S1805 can be executed by comparing the edge blurring width difference $\Delta\omega_{AF}(R-G)$ corresponding to any edge, regardless of its direction, with a reference value $\Delta\omega_{AF}(R-G)=0.3$.

While a reference other than 0, i.e., 0.3 is used in the latter case, the use of such a reference value will not cause any particular problem. The specific value assumed for $\Delta\omega_{AF}(R-G)$ in the focusing condition is dependent on the particulars of the optical system and the focusing operation such as contrast AF, and a condition in which the overall contrast corresponding to all the color components, R, G and B is optimized is often defined as the focusing condition. This means that $\Delta\omega_{AF}(R-G)$ pertaining to two color components alone, (R and G in this example) may not always assume the value of 0 even in the focusing condition. In other words, any values may be achieved through the correction, as long as the image is corrected to eliminate the edge-direction dependency of $\Delta\omega_{AF}(R-G)$.

The operation then proceeds to step S1805, in which the control device 104 detects the focusing position based upon the axial chromatic aberration by executing the processing in steps S604 through S614 in FIG. 6 for the image having undergone the correction in step S1804 executed to correct the change in the relative resolution levels corresponding to the individual color components. Subsequently, the processing ends.

The following advantages are achieved through the forth embodiment described above.

The control device 104 determines the focusing condition after correcting any change in the relative resolution levels corresponding to the individual color components, attributable to a factor other than axial chromatic aberration. As a result, a uniform index value representing the focusing condition, to be used as the threshold to determine the focusing condition based upon the edge blurring width difference between two colors attributable to axial chromatic aberration, can be set regardless of the specific direction along which a given edge in the input image may extend, the color assumed on the two sides of the edge, the shape of the section taken across the edge or the conditions of the optical system such as the photographing distance and the zoom position. Consequently, better accuracy is assured for focusing position detection executed by comparing a index value on focusing position detection with the reference value representing the focusing condition. In addition, since focusing operation can be executed in a camera engaged in subject tracking or video shooting by using a fixed reference value representing the focusing condition, which remains unchanged even if the edge direction rotates due to a displacement of the subject within the input image, the photographic distance changes due to back-and-forth movement of the subject, or even as the subject color changes due to a change in lighting, reliable focus adjustment is enabled through focusing condition detection executed based upon stable axial chromatic aberration.

—Variations of Second Through Fourth Embodiments—

It is to be noted that the cameras achieved in the second through fourth embodiments as described above allow for the following variations.

(1) The conversion edge blurring width difference Δw is calculated as expressed in (12) in the second embodiment described earlier. As an alternative, the conversion edge blurring width difference Δw may be calculated through one of the following methods described in (1-A) to (1-D) below.

(1-A) The control device 104 may calculate a conversion edge blurring width difference Δw as expressed in (13) below by directly measuring the R-component edge blurring width $w_R$ and the G-component edge blurring width $w_G$ from an edge having been detected within an evaluation target area and normalized as indicated in FIG. 8B. This method allows the conversion edge blurring width difference Δw should be calculated through a simple calculation operation and thus achieves a reduction in the amount of calculation needed to calculate the conversion edge blurring width difference Δw compared to the above embodiments.

$$\Delta w_{R-G} = w_R - w_G \qquad (13)$$

(1-B) The control device 104 may indirectly calculate a conversion edge blurring width difference Δw by measuring the gradient of an edge having been detected from an evaluation target area and normalized as indicated in FIG. 8B. More specifically, a relationship expressed in (14) below exists among the R-component edge blurring width $w_R$, the R-component edge gradient $g_R$ and the contrast difference C between the two sides of the edge and a relationship expressed in (15) below exists among the G-component edge blurring with $w_G$, the G-component edge gradient $g_G$ and the contrast difference C between the two sides of the edge.

$$g_R = \frac{C}{w_R} \qquad (14)$$

$$g_G = \frac{C}{w_G}, \qquad (15)$$

Accordingly, the control device 104 is able to calculate the conversion edge blurring width difference Δw as expressed in (16) below.

$$\Delta w_{R-G} = C\left(\frac{1}{g_R} - \frac{1}{g_G}\right) \qquad (16)$$

This method, too, allows the conversion edge blurring width difference Δw to be calculated through a simple calculation operation and thus achieves a reduction in the amount of calculation needed to calculate the conversion edge blurring width difference Δw compared to the above embodiments.

Figure 23:
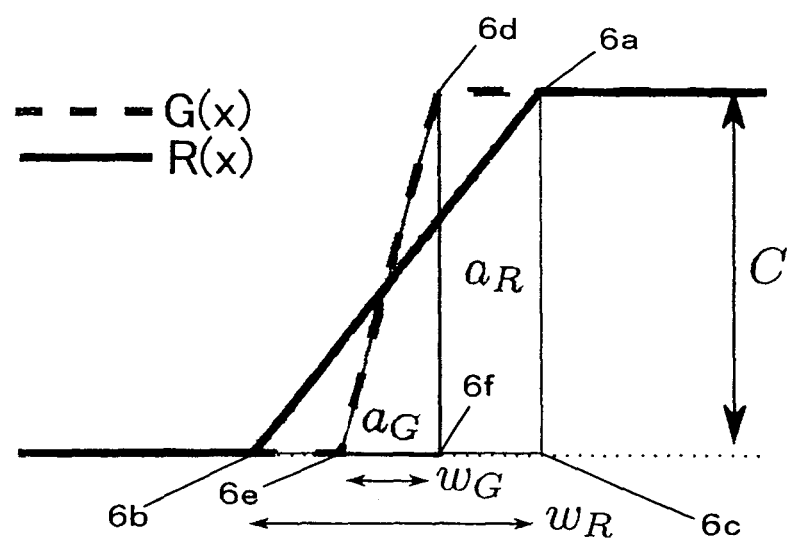
FIG. 23 indicates how the sum of color differences between two-color edges may be calculated.

(1-C) The control device 104 may indirectly calculate Δw by ascertaining through measurement a color difference sum for the edge area E. For instance, in conjunction with the R-component edge R(x) and the G-component edge G(x) shown in FIG. 8B, result from the normalization, a color difference sum $\Delta a_{R-G}$ representing the sum of the color differences between the two color components R and G in the edge area E, can be calculated as expressed in (17) below, based upon an R-component edge brightness area $a_R$ and a G-component edge brightness area $a_G$ shown in FIG. 23.

$$\Delta a_{R-G} = a_R - a_G \qquad (17)$$

In the conversion edge, a relationship expressed in (18) below exists among the R-component edge brightness area $a_R$ represented by the area of a triangle, the vertices of which are taken at a point 6a, a point 6b and a point 6c, the R-component edge blurring width $w_R$ and the contrast difference C between the two sides of the edge and a relationship expressed in (19) below exists among the G-component edge brightness area $a_G$ represented by the area of a triangle, the vertices of which are taken at a point 6d, a point 6e and a point 6f, the G-component edge blurring width $w_G$ and the contrast difference C between the two sides of the edge.

$$a_R = \frac{1}{2} C w_R \qquad (18)$$

$$a_G = \frac{1}{2} C w_G \qquad (19)$$

Accordingly, the control device 104 is able to calculate the conversion edge blurring width difference Δw as expressed in (20) below.

$$\Delta w_{R-G} = \frac{2}{C} \Delta a_{R-G} = \frac{2}{C}(a_R - a_G) \qquad (20)$$

This method, too, allows the conversion edge blurring width difference Δw to be calculated through a simple calculation operation and thus achieves a reduction in the amount of calculation needed to calculate the conversion edge blurring width difference Δw compared to the above embodiments.

Figure 24:
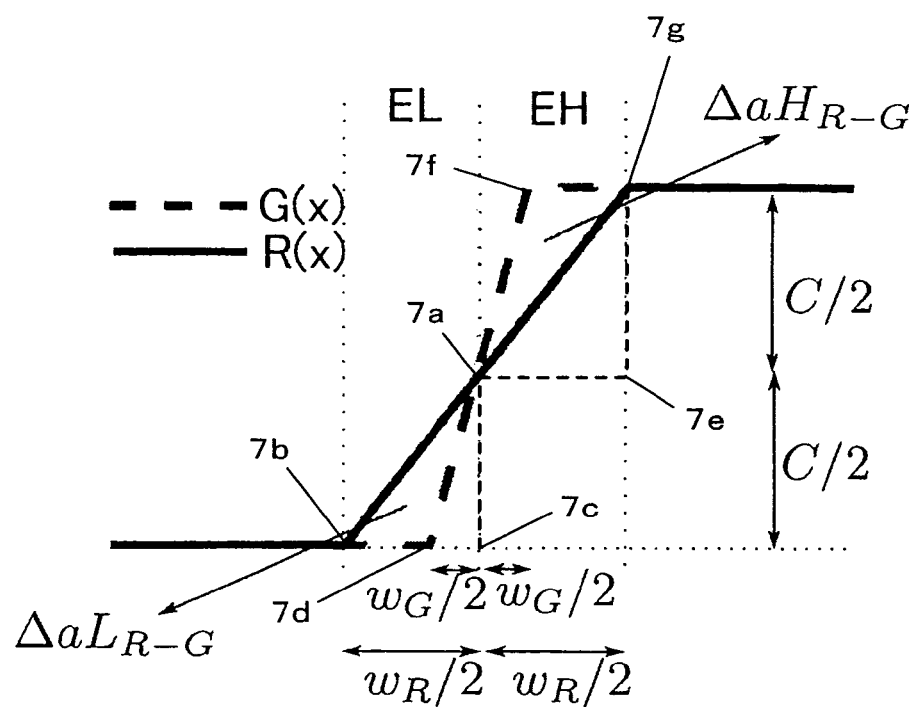
FIG. 24 indicates how the sum of color differences between two-color edges may be calculated.

(1-D) The control device 104 may divide the edge area E containing the normalized R-component edge R(x) and the normalized G-component edge G(x) shown in FIG. 8B into a sub edge area EL and a sub edge area EH, as shown in FIG. 24 with a median value of the edge area E set as the cutoff point. As a result, the R-component edge blurring width $w_R$ and the G-component edge blurring width $w_G$ are each split into two equal portions at the common cutoff point set for the R component and the G component. In other words, while the R-component edge blurring width $w_R$ will be split into two equal widths $w_R/2$ at the cutoff point set at the median of the edge area E, the G-component edge blurring width $w_G$ is split into two equal widths $w_G/2$ at the cutoff point set at the median of the edge area E.

The control device 104 adopting this method should then calculate the color difference sum of the color differences between two colors in correspondence to each of the sub edge areas EL and EH into which the edge area has been divided. As indicated in expression (17) mentioned earlier in (1-C) above, the color difference sum is equal to the difference between the R-component edge brightness area and the G-component edge brightness area. In the example presented in FIG. 24, the color difference sum $\Delta aL_{R-G}$ of the color differences between the two color components R and G in the sub edge area EL, represented by the difference between the area of a triangle, the vertices of which are taken at a point 7a, a point 7b and a point 7c and the area of a triangle, the vertices of which are taken at the point 7a, a point 7d and the point 7c, can be calculated as expressed in (21) below.

$$\Delta aL_{R-G} = \left[\frac{1}{2}(C/2)(w_R/2)\right] - \left[\frac{1}{2}(C/2)(w_G/2)\right] \quad (21)$$
$$= \frac{1}{8}C\Delta w_{R-G}$$

The color difference sum $\Delta aH_{R-G}$ of the color differences between the two color components R and G in the sub edge area EH, represented by the difference between the area of a triangle, the vertices of which are taken at the point 7a, a point 7e and a point 7g, and the area of a trapezoid, the vertices of which are taken at the point 7a, the point 7e, a point 7f and the point 7g, can be calculated as expressed in (22) below.

$$\Delta aH_{R-G} = \left[\frac{1}{2}(C/2)(w_R/2)\right] - \quad (22)$$
$$\left[\frac{1}{2}(C/2)(w_R/2 + (w_R/2 - w_G/2))\right]$$
$$= \frac{1}{8}C\Delta w_{R-G}$$

Based upon the calculation results obtained as expressed in (21) and (22), the control device 104 is able to calculate the conversion edge blurring width difference $\Delta w$, i.e., $\Delta w_{R-G}$, as expressed in (23) below.

$$\Delta w_{R-G} = -\frac{4}{C}(\Delta aH_{R-G} - \Delta aL_{R-G}) \quad (23)$$

Through this method in which color difference sums are calculated by referencing the common sub edge areas EL and EH of the two color components manifesting the axial chromatic aberration, the conversion edge blurring width difference $\Delta w$ can be calculated with better accuracy over the methods described above in (1-A) through (1-C).

It is to be noted that while the edge area E is divided into two sub edge areas EL and EH with the median value set as the cutoff point in the example described above, the edge area E may be divided into even smaller sub edge areas and a color difference sum may be calculated in correspondence to each of the smaller sub edge areas. In such a case, a conversion edge blurring width difference $\Delta w$ can be indirectly calculated by assuming an optimal weighted linear sum for the color difference sum calculated in correspondence to each sub edge area.

(2) The control device 104 in the second embodiment described above divides the edge area E into the sub edge areas EL and EH by using the mean value $E_{mean}$ of the pixel values indicated at the pixels in the edge area E. As an alternative, the control device 104 may divide the edge area E into a sub edge area EL and a sub edge area EH by using a value, obtained based upon statistical distributions of pixel values in the flat areas F and the edge area E, as a threshold value. The sub edge areas EL and EH are allowed to contain overlapping pixels in this alternative.

(3) The control device 104 in the second embodiment divides the edge area E into two sub edge areas EL and EH. However, the present invention is not limited to this example and the control device 104 may divide the edge area E into three or more sub edge areas El to En. In such a case, a value equivalent to the evaluation value I, calculated through a coefficient weighted operation of color difference sums corresponding to El through En by using specific coefficients, may be used in place of the evaluation value I described earlier, or an evaluation value I may calculated by further grouping pixel values in each sub edge area into hierarchical pixel aggregates. In addition, if the evaluation target area image contains any edge for which valid conversion edge approximation cannot be achieved, the evaluation value I may be corrected by taking into consideration the presence of such an edge.

(4) The focusing position may be determined with even better accuracy in the second embodiment by up-sampling the image before separating the edge area into the two sub edge areas EL and EH. When the lens position is close to the focus match point and the edge width is small, in particular, a marked improvement in the resolving power with which the area is divided, will be achieved through such up-sampling, to make possible a significant improvement in the accuracy. In this case, the highest possible magnification factor should be assumed for the up-sampling operation within the allowable range set in correspondence to the calculation load. In addition, pixel interpolation for the magnified image may be achieved through simple bilinear interpolation executed by using the surrounding pixels.

(5) The application range for the present invention is not limited to that of the third embodiment, in which the present invention is adopted in conjunction with a reduced Bayer array raw image obtained through a 2×2 pixel sum read. For instance, the present invention may be adopted in conjunction with the initial Bayer array raw image. The interpolation processing executed on a Bayer array raw image may include interpolation executed in a luminance and chrominance space or edge enhancement. While such interpolation and edge enhancement contribute toward generation of an image with a superior image quality, a subtle difference between the blurring widths of two color components may be smoothed out through the interpolation and, for this reason, the focusing position can be detected with better accuracy based upon the axial chromatic aberration by using the raw image that has not been interpolated. As a further alternative, the present invention may be adopted in conjunction with an image having already been interpolated. Namely, the present invention may be adopted in conjunction with an image holding R, G and B values at each pixel, generated by interpolating a Bayer array raw image, as long as the focusing position can be detected without being affected by any change in relative resolution levels corresponding to the individual color components, attributable to image processing such as interpolation, by selectively using pixels originating from the initial Bayer array raw image. In either case, it is crucial to select the combination of pixels achieving a best match with regard to the resolution levels and the sampling positions, in correspondence to the combination of the two color components manifesting the axial chromatic aberration based upon which the focusing position is to be determined.

(6) While the focusing position detection processing is executed in the third and fourth embodiments described above in conjunction with an image generated via an interpolation device that is not optimized for pixel sum read, the present invention is not limited to this example. It may be adopted in conjunction with an image manifesting a change in relative resolution levels corresponding to the individual color components attributable to, for instance, any of various types of image processing such as edge direction adaptive interpolation processing, noise removal, edge enhancement and color tone conversion executed for purposes of image quality improvement or attributable to a factor introduced by the image sensor. In addition, the present invention may be adopted when a change in relative resolution levels occurs among the various color components attributable to the particulars of the colors assumed on the two sides of the edge, the shape of the section taken across the edge (edge shape), or the optical system conditions, such as the photographing distance and the zoom position, as well as when a change in the relative resolution levels dependent on the edge direction occurs.

(7) In the fourth embodiment described above, the change in $\Delta\omega_{AF}(R-G)$ occurring in correspondence to eight different edge directions, i.e., the vertical, horizontal and diagonal directions, is measured, as indicated in FIG. 20. As an alternative, a change that occurs in correspondence to edge angles set in finer directional increments may be investigated so as to determine coefficients assuring even more accurate correction.

(8) In the fourth embodiment described above, the correction in step S1804 in FIG. 18 is achieved through smoothing. However, correction may be achieved through a means other than smoothing. For instance, the correction may be achieved through processing such as edge enhancement, as long as the change in the relative resolution levels corresponding to the individual color components can be corrected. Furthermore, a change attributable to the particulars of the colors assumed on the two sides of the edge, the shape of the section taken across the edge or the optical system conditions, such as the photographing distance and the zoom position, instead of the edge-direction dependent change, may be likewise investigated and a means for correcting the adverse effect of such a change may be determined in advance. Moreover, the characteristics of the target edge, which will vary depending upon the input image, may be investigated each time in step S1804 so as to adaptively adjust the amount of correction relative to a predetermined coefficient.

(9) The present invention is adopted in the camera 100 in the second through fourth embodiments described above. However, the present invention is not limited to this example and may be adopted in another type of photographing device equipped with an autofocusing function.

It is to be noted that as long as the features characterizing the present invention are not compromised, the present invention is not limited to any of the specific structural particulars described herein. The embodiments described above may be adopted singularly or in combination to realize a singular advantage or combination of advantages The above described embodiments are examples, and various modifications can be made without departing from the scope of the invention.

What is claimed is:

1. An image-capturing device, comprising:
an input unit that inputs a subject image formed by an optical system manifesting axial chromatic aberration as an input image;
an edge detection unit that detects edges in the input image input by the input unit, each in correspondence to one of color components;
a focus adjustment unit that executes focus adjustment for the optical system by detecting contrast differences of the edges corresponding to individual color components having been detected by the edge detection unit and then moving a focus adjustment lens included in the optical system;
a lens moving direction determining unit that determines a moving direction along which the focus adjustment lens is to move for purposes of focus adjustment based upon a difference between the edges corresponding to the individual color components having been detected by the edge detection unit and the axial chromatic aberration;
a resolution change correction unit that corrects a resolution change occurring in relative resolution levels of the individual color components due to a factor other than the axial chromatic, aberration, based upon the edges corresponding to the individual color components having been detected by the edge detection unit; and
a calculation unit that calculates a blurring width difference indicating a difference between edge blurring widths of edges corresponding to two color components each manifesting the axial chromatic aberration among, the edges of the individual color components having been detected by the edge detection unit,
wherein:
the lens moving direction determining unit determines the moving direction along which the focus adjustment lens is to move based upon the blurring width difference having been calculated by the calculation unit,
the blurring width difference is calculated by the calculation unit based upon the edges corresponding to the individual color components detected by the edge detection unit from an image having been corrected by the resolution change correction unit for any resolution change in relative resolution levels of the individual color components, and
the focus adjustment unit causes the focus adjustment lens to move along the moving direction determined by the lens moving direction determining unit.

2. An image-capturing device according to claim 1, wherein:
the calculation unit calculates a specific evaluation value based upon a color difference sum of color differences for the edges corresponding to the two color components manifesting the axial chromatic aberration and calculates the blurring width difference by using the evaluation value thus calculated.

3. An image-capturing device according to claim 2, wherein:
the calculation unit divides the edges corresponding to the two color components manifesting the axial chromatic aberration into a flat portion and an edge portion and calculates the color difference sum for the edge portion.

4. An image-capturing device according to claim 1, wherein:
the calculation unit individually measures the edge blurring widths of the edges corresponding to the two color components manifesting the axial chromatic aberration and calculates the blurring width difference based upon measurement results.

5. An image-capturing device according to claim 1, wherein:
the calculation unit calculates the blurring width difference based upon the edge blurring widths and edge gradients of the edges corresponding to the two color components manifesting the axial chromatic aberration, as well as the contrast differences each manifesting between two sides of one of the edges.

6. An image-capturing device according to claim 1, wherein:
the calculation unit calculates the blurring width difference based upon edge brightness areas of one of the edges corresponding to the two color components manifesting the axial chromatic aberration and the contrast differences each manifesting between two sides of an edge.

7. An image-capturing device according to claim 1, further comprising:
a color correction unit that executes correction so as to eliminate the contrast differences each manifesting between two sides of one of the edges corresponding to the two color components manifesting the axial chromatic aberration, wherein:
the calculation unit calculates the blurring width difference by using an image resulting from the correction executed by the color correction unit.

8. An image-capturing device according to claim 1, wherein:
the calculation unit calculates the blurring width difference only after executing up-sampling processing on the input image.

9. An image-capturing device, comprising:
an input unit that inputs a subject image formed by an optical system manifesting axial chromatic aberration as an input image;
an edge detection unit that detects edges in the input image input by the input unit, each in correspondence to one of color components;
a focus adjustment unit that executes focus adjustment for the optical system by detecting contrast differences of the edges corresponding to individual color components having been detected by the edge detection unit and then moving a focus adjustment lens included in the optical system; and
a lens moving direction determining unit that determines a moving direction along which the focus adjustment lens is to move for purposes of focus adjustment based upon the edges corresponding to the individual color components having been detected by the edge detection unit and the axial chromatic aberration; and
a selection unit that selects two color components manifesting the axial chromatic aberration among color components constituting the input image; and
a calculation unit that calculates a blurring width difference indicating a difference between edge blurring widths of edges corresponding to two color components selected by the selection unit, wherein:
the selection unit selects pixels representing two color components, to be used to achieve uniformity of resolution, which assumes varying levels due to a factor other than axial chromatic aberration, in correspondence to a direction of an edge present in the input image;
the lens moving direction determining unit determines the moving direction along which the focus adjustment lens is to move based upon the blurring width difference having been calculated by the calculation unit; and
the focus adjustment unit causes the focus adjustment lens to move along the moving direction determined by the lens moving direction determining unit.

10. An image-capturing device according to claim 9, wherein:
the input image is a raw image generated through a pixel sum read.

11. An image-capturing device according to claim 10, wherein:
the selection unit selects the pixels representing the two color components, to be used to achieve uniformity of resolution, which assumes varying levels due to a factor other than the axial chromatic aberration, by taking into consideration a positional relationship between pixel positions assumed by pixels representing various color components in an initial raw image read out from an image sensor and pixel positions assumed by pixels representing the various color components in the raw image generated through the pixel sum read.

12. An image-capturing device according to claim 9, wherein:
the input image is an image having undergone interpolation processing.

13. An image-capturing device according to claim 1, wherein:
occurrence of the resolution change in relative resolution levels of the individual color components is attributable to a pixel sum read from an image sensor or image processing.

14. An image-capturing device according to claim 1, wherein:
the resolution change in relative resolution levels of the individual color components has dependency on an edge direction relative to a pixel array assumed for pixels constituting the image, colors assumed on two sides of the edge, the shape of the edge and a condition in the optical system.

15. An image-capturing device according to claim 1, wherein:
the resolution change correction unit corrects the resolution change by applying a smoothing filter assuming a preselected coefficient to pixels representing a color component, a resolution level of which is to match the resolution level of another color component.

16. An image-capturing device according to claim 1, wherein:
the resolution change correction unit corrects the resolution change by applying an edge enhancement filter assuming a preselected coefficient to pixels representing a color component, a resolution level of which is to match the resolution level of another color component.

17. An image-capturing device according to claim 15, wherein:
the resolution change correction unit alters the coefficient based upon edge characteristics unique to the input image.

18. An image-capturing device according to claim 1, further comprising:
an edge area image extraction unit that extracts from the input image an edge area image containing the edges corresponding to individual color components having been detected by the edge detection unit, wherein:
the lens moving direction determining unit determines the moving direction along which the focus adjustment lens is to move by using the edge area image having been extracted by the edge area image extraction unit.

19. An image-capturing device according to claim 18, further comprising:
a color correction unit that executes color correction so as to eliminate a color difference manifested between two sides of an edge in the edge area image having been extracted by the edge area image extraction unit, wherein:

the lens moving direction determining unit determines the moving direction along which the focus adjustment lens is to move by using the edge area image having undergone the color correction executed by the color correction unit.

20. An image-capturing device according to claim 19, wherein:

the color correction unit executes the color correction by normalizing color ratios of the individual color components in areas on the two sides of the edge so that the color ratios achieve a specific value.

21. An image-capturing device according to claim 19, further comprising:

a magnification chromatic aberration correction unit that executes magnification chromatic aberration correction to correct any chromatic aberration of magnification manifesting in the edge area image having undergone the color correction executed by the color correction unit, wherein:

the lens moving direction determining unit determines the moving direction along which the focus adjustment lens is to move by using the edge area image having undergone the magnification chromatic aberration correction executed by the magnification chromatic aberration correction unit.

22. An image-capturing device according to claim 21, wherein:

the magnification chromatic aberration correction unit executes the magnification chromatic aberration correction by shifting charts each indicating edge intensity corresponding to one of the color components within the edge area image so as to reduce an extent of offset manifested by the charts corresponding to the individual color components.

23. An image-capturing device according to claim 18, further comprising:

a usability determining unit that determines whether or not the edge area image having been extracted by the edge area image extraction unit can be used to determine the moving direction along which the focus adjustment lens is to move, wherein:

the lens moving direction determining unit determines the moving direction along which the focus adjustment lens is to move by using the edge area image determined to be usable by the usability determining unit.

24. An image-capturing device, comprising:

an input unit that inputs a subject image formed by an optical system manifesting axial chromatic aberration as an input image;

an edge detection unit that detects edges in the input image input by the moving direction, each in correspondence to one of color components;

a focus adjustment unit that executes focus adjustment for the optical system by detecting contrast differences of the edges corresponding to individual color components having been detected by the edge detection unit and then moving a focus adjustment lens included in the optical system; and a lens moving direction determining unit that determines a moving direction along which the focus adjustment lens is to move for purposes of focus adjustment based upon the edges corresponding to the individual color components having been detected by the edge detection unit and the axial chromatic aberration;

an edge area image extraction unit that extracts from the input image an edge area image containing the edges corresponding to individual color components having been detected by the edge detection unit; and a usability determining unit that determines whether or not the edge area image having been extracted by the edge area image extraction unit can be used to determine the moving direction along which the focus adjustment lens is to move, wherein:

the usability determining unit determines the edge area image to be usable if an extent of offset manifested by charts each indicating edge intensity corresponding to one of the color components within the edge area image, is less than a predetermined offset quantity;

the lens moving direction determining unit determines the direction along which the focus adjustment lens is to move by using the edge area image determined to be usable by the usability determining unit; and the focus adjustment unit causes the focus adjustment lens to move along the moving direction determined by the lens moving direction determining unit.

25. An image-capturing device according to claim 18, wherein:

the lens moving direction determining unit determines the moving direction along which the focus adjustment lens is to move by calculating an index value for the edge area image, to be used when determining the direction along which the focus adjustment lens is to move, and comparing the index value with a preselected threshold value.

26. An image-capturing device according to claim 25, wherein:

the lens moving direction determining unit calculates the index value based upon a color ratio pertaining to a color component manifesting an axial chromatic aberration different from axial chromatic aberration of another color component, among the individual color components in the edge area image.

27. An image-capturing device according to claim 25, further comprising:

a history recording unit that records index value history indicating values previously calculated for the index value, wherein:

the lens moving direction determining unit sets the threshold value based upon the index value history recorded by the history recording unit.

* * * * *